(12) United States Patent  
Kamijo et al.

(10) Patent No.: US 7,850,749 B2  
(45) Date of Patent: Dec. 14, 2010

(54) FUEL REFORMER SUPPRESSING UNEVEN TEMPERATURE DISTRIBUTION IN REFORMING ELEMENT

(75) Inventors: Motohisa Kamijo, Kamakura (JP); Hiromichi Miwa, Yokohama (JP); Luc Rouveyre, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 515 days.

(21) Appl. No.: 10/594,574

(22) PCT Filed: Mar. 30, 2005

(86) PCT No.: PCT/JP2005/006712

§ 371 (c)(1), (2), (4) Date: Sep. 27, 2006

(87) PCT Pub. No.: WO2005/095267

PCT Pub. Date: Oct. 13, 2005

(65) Prior Publication Data

US 2007/0137104 A1   Jun. 21, 2007

(30) Foreign Application Priority Data

Apr. 2, 2004   (JP) .............................. 2004-110166

(51) Int. Cl.
*B01J 8/00*   (2006.01)
(52) U.S. Cl. ........................ 48/127.9; 422/149; 422/187
(58) Field of Classification Search .................. 48/127.9
See application file for complete search history.

(56) References Cited

U.S. PATENT DOCUMENTS 5,609,834 A * 3/1997 Hamada et al. ............. 422/196
6,159,434 A * 12/2000 Gonjo et al. ................ 422/191
6,254,848 B1   7/2001 Autenrieth et al.
6,680,044 B1   1/2004 Tonkovich et al.

(Continued)

FOREIGN PATENT DOCUMENTS

EP   0 861 802 A2   9/1998

(Continued)

OTHER PUBLICATIONS

International Search Report received in application No. PCT/JP2006/006712 (4 pgs.).

*Primary Examiner*—Alexa D Neckel
*Assistant Examiner*—Imran Akram
(74) *Attorney, Agent, or Firm*—Foley & Lardner LLP

(57) ABSTRACT

A fuel reformer includes a reforming element (7) having at least one reforming catalyst passage (22) supporting a reforming catalyst which generates reformate gas from fuel; and a combustion element (8) having at least one combustion gas passage (11), which heats the reforming element (7) by the heat of combustion gas generated by burning the generated reformate gas supplied in air introduced in said at least one combustion gas passage (11). The reforming element (7) and combustion element (8) are laminated in the fuel reformer. The fuel reformer further includes plural supply holes (13) arranged in a line along said at least one combustion gas passage (11), each supply hole (13) communicating with said at least one combustion gas passage (11). At least part of the generated reformate gas is supplied to each supply hole, and is burnt downstream of each supply hole.

20 Claims, 28 Drawing Sheets

U.S. PATENT DOCUMENTS

2003/0072699 A1* 4/2003 Tonkovich et al. .......... 422/190
2003/0234123 A1* 12/2003 Schumann et al. ......... 180/65.1
2005/0172556 A1* 8/2005 Powell et al. .............. 48/198.2

FOREIGN PATENT DOCUMENTS

| | | | |
|---|---|---|---|
| JP | 2002-295811 A | 10/2002 | |
| WO | WO 02/086987 A2 | 10/2002 | |
| WO | WO 03/076062 A2 | 9/2003 | |
| WO | WO 03/083984 A2 | 10/2003 | |

* cited by examiner

US 7,850,749 B2

FUEL REFORMER SUPPRESSING UNEVEN TEMPERATURE DISTRIBUTION IN REFORMING ELEMENT

FIELD OF THE INVENTION

This invention relates to a fuel reformer which generates reformate gas to be supplied to a fuel cell, and in particular relates to a fuel reformer which is heated by the heat of combustion gas generated by combustion elements.

BACKGROUND OF THE INVENTION

Tokkai Hei 2002-295811 published by the Japan Patent Office in 2002 discloses a combustion device which generates high temperature gas for heating an object such as heat exchanger. This combustion device supplies fuel at plural positions in the flow direction of a lean fuel/air mixture, and generation of NOx and unburnt fuel is suppressed. The generated high temperature gas is supplied to the object to be heated which is situated downstream.

SUMMARY OF THE INVENTION

However, in the aforesaid prior art, the heated object is situated downstream of the combustion device, so an uneven temperature distribution occurs wherein the inlet of the combustion gas passage of the heated object is at the highest temperature, and the temperature gradually falls towards the outlet.

It is therefore an object of this invention to provide a fuel reformer which suppresses an uneven temperature distribution in a reforming element which is to be heated.

In order to achieve the above object, this invention provides a fuel reformer, comprising a reforming element comprising at least one reforming catalyst passage supporting a reforming catalyst which generates reformate gas from fuel; and a combustion element having at least one combustion gas passage, which heats the reforming element by the heat of combustion gas generated by burning the generated reformate gas supplied in air introduced in said at least one combustion gas passage. The reforming element and combustion element are laminated in the fuel reformer. The fuel reformer further comprises plural supply holes arranged in a line along said at least one combustion gas passage, each supply hole communicating with said at least one combustion gas passage. At least part of the generated reformate gas is supplied to each supply hole, and is burnt downstream of each supply hole.

The details as well as other features and advantages of this invention are set forth in the remainder of the specification and are shown in the accompanying drawings.

DESCRIPTION OF THE PREFERRED EMBODIMENTS

FIG. 1-FIG. 4 show a first embodiment of a fuel reformer.

Figure 1:
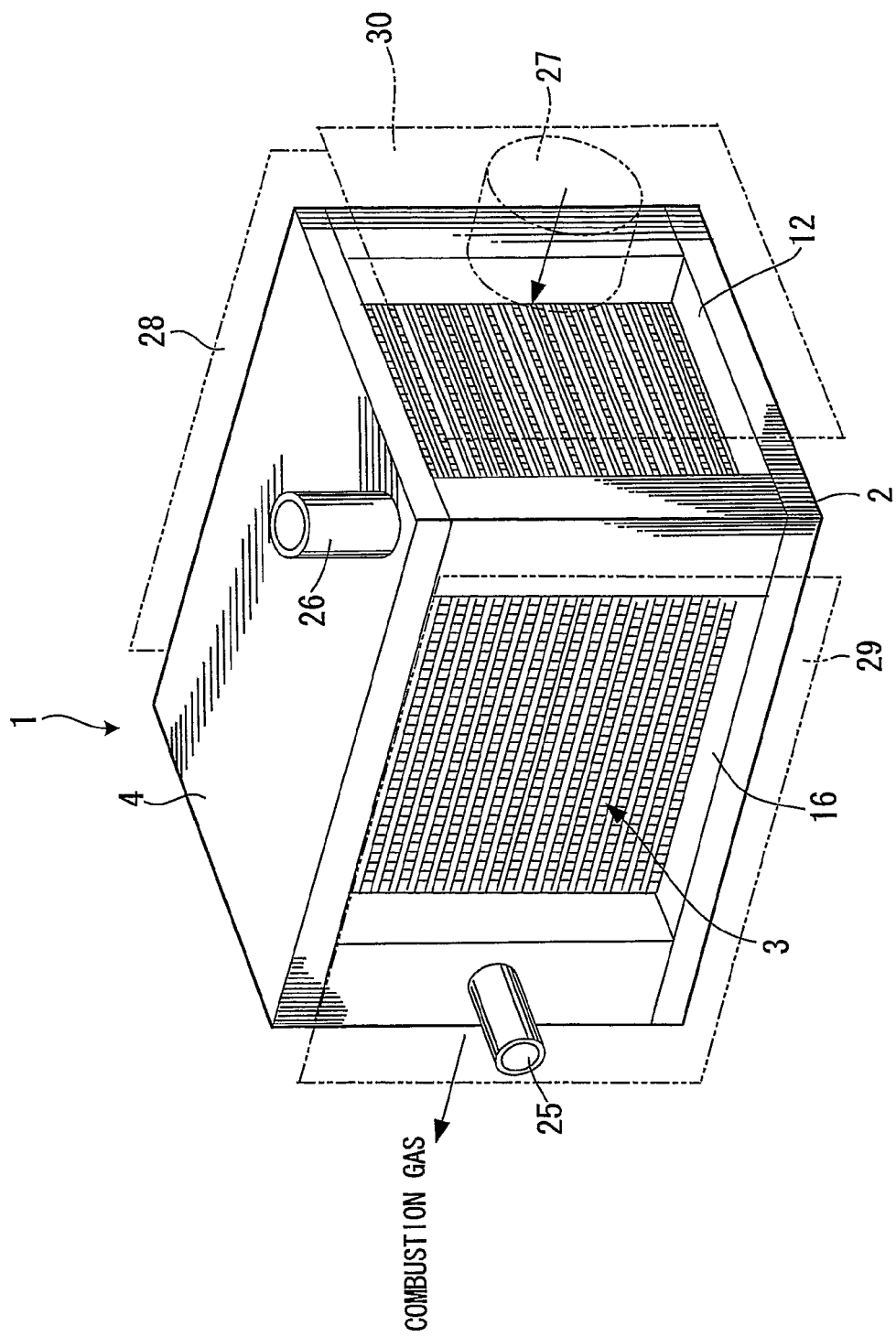
FIG. 1 is a cut-away perspective view of a fuel reformer according to a first embodiment.

Referring to FIG. 1, a fuel reformer 1 comprises a lower end plate 2, plural fuel reforming units 3 laminated on the end plate 2, and an upper end plate 4. The fuel reformer 1 is tightened by a clamping means, not shown, in the lamination direction.

Figure 2:
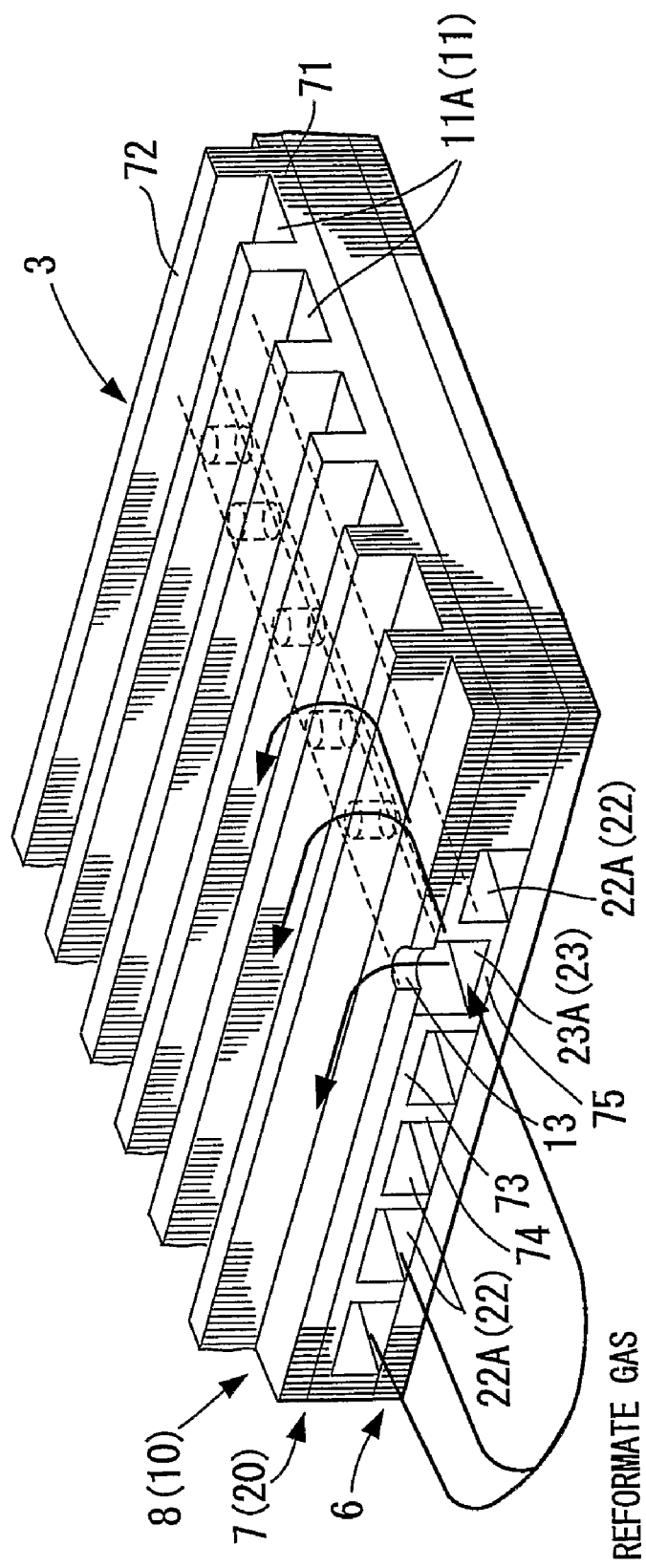
FIG. 2 is a partial perspective view of a laminated fuel reforming unit.

As shown in FIG. 2, the fuel reforming unit 3 is formed by laminating a plate-shaped reforming elements 7 and plate-shaped combustion elements 8 on a partition plate 6. In the combustion elements 8, combustible gas is burnt by oxygen in the air, and the adjacent reforming element is heated by the resultant heat. The combustion element 8 has a horizontal part 71 substantially perpendicular to the lamination direction, and a vertical part 72 (projecting part) extending essentially in the lamination direction from a horizontal part 71.

Figure 3:
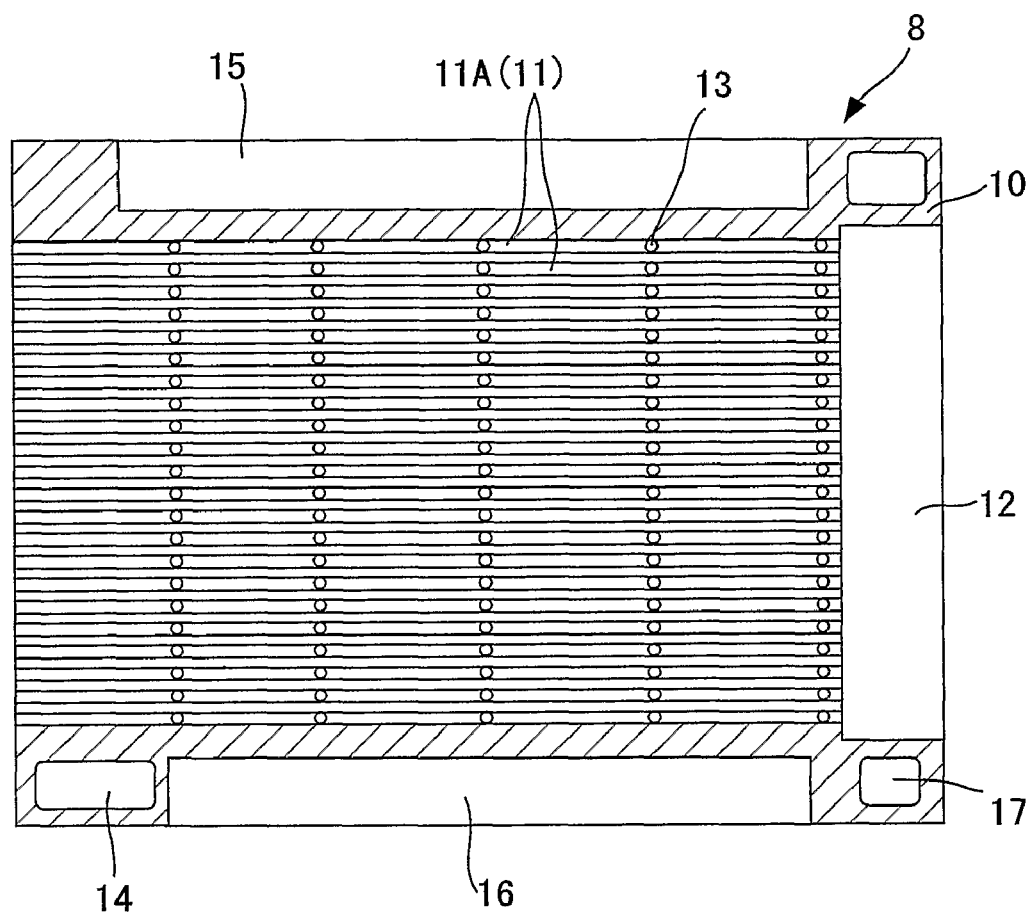
FIG. 3 is a cross-sectional plan view of a combustion element forming the fuel reforming unit.

Referring to FIG. 3, the combustion element 8 has plural grooves 11A arranged parallel to one surface of a plate body 10 (member 10). The grooves 11A are defined by a horizontal part 71, and a vertical part 72. The grooves 11A are covered by the partition plate 6 laminated on the combustion elements 8, thereby forming plural combustion gas passages (hereafter, referred to also as oxidation catalyst passages) 11. One end of the combustion gas passage 11 opens into an air manifold 12 formed by notches in the plate body 10, and the other end opens to the edge of the plate 10. Hereafter, the opening at the other end of the plate body 10 is referred to as the outlet of the combustion gas passage 11. The passage walls of the combustion gas passages 11 formed from plural grooves 11A and partition plates 6 support an oxidation catalyst for oxidizing fuel or combustible gases in the reformate gas, by a method described later. Plural supply holes (or openings) 13 are bored in the base (i.e., a horizontal part 71) of the grooves 11A forming the combustion gas passages 11. The plural supply holes 13 are arranged in a line along the combustion gas passage 11 at a specified interval from near the end part on the air manifold 12 side of the combustion gas passages 11. As shown in FIG. 2, reformate gas is introduced into the combustion gas passage 11 from the reforming element 7 via the supply holes 13.

On the periphery of the plate body 10 of the combustion element 8, a starting material vapor manifold 15 is arranged on the outside of the set of combustion gas passages 11 on one side, and a starting material manifold 14, reformate gas manifold 16 and reformate gas outlet manifold 17 are arranged on the other side. These manifolds 14-17 are formed not to communicate the combustion gas passages 11 and air manifold 12. The starting material vapor manifold 15 and reformate gas manifold 16 are arranged in a middle position opposite each other, and are formed by notches in the edge of the plate body 10. The reformate gas outlet manifold 17 and starting material manifold 14 are arranged on opposite sides of the reformate gas manifold 16. The reformate gas outlet manifold 17 is arranged on the side of the air manifold 12, and the starting material manifold 14 is arranged on the opposite side to the reformate gas outlet manifold 17. The reformate gas outlet manifold 17 and starting material manifold 14 are openings which do not communicate with the other manifolds 12, 15, 16 in the plate body 10.

The combustion element 8 is formed so that air may be supplied to combustion gas passages 11 from the air manifold 12. Combustible gases, such as $H_2$, $CO$, $CH_4$ in the reformate gas supplied from the supply holes (or openings) 13, are burnt by oxygen in the air, and the combustion element 8 generates heat. Combustion takes place downstream of the supply holes 13 to which reformate gas is supplied, which open into the combustion gas passages 11, and heat is generated at several positions in the combustion gas passages 11 along the direction of the flow of combustion gas. The combustion heat generated in the combustion gas passages 11 reaches the plate body 10, reaches a plate body 20 of the adjacent reforming element 7, and the reforming element 7 is heated by the combustion heat.

An excess air ratio relative to the combustible gas in the combustion gas passages 11 is always set to be lean, i.e., exceeding 1. The combustion temperature of the combustible gas is set based on the number and inner diameter of the supply holes 13, the pressure applied to the combustion element 8 during operation, and the pressure applied to the reforming element 7 during operation, so that it is below the heat-resistance temperature of the reforming catalyst in the reforming element 7, but equal to or more than a reforming catalyst reaction minimum temperature. The reforming catalyst reaction minimum temperature, below which the reforming catalyst reaction does not easily to occur, is determined from the reaction rate of the reforming reaction.

Figure 4:
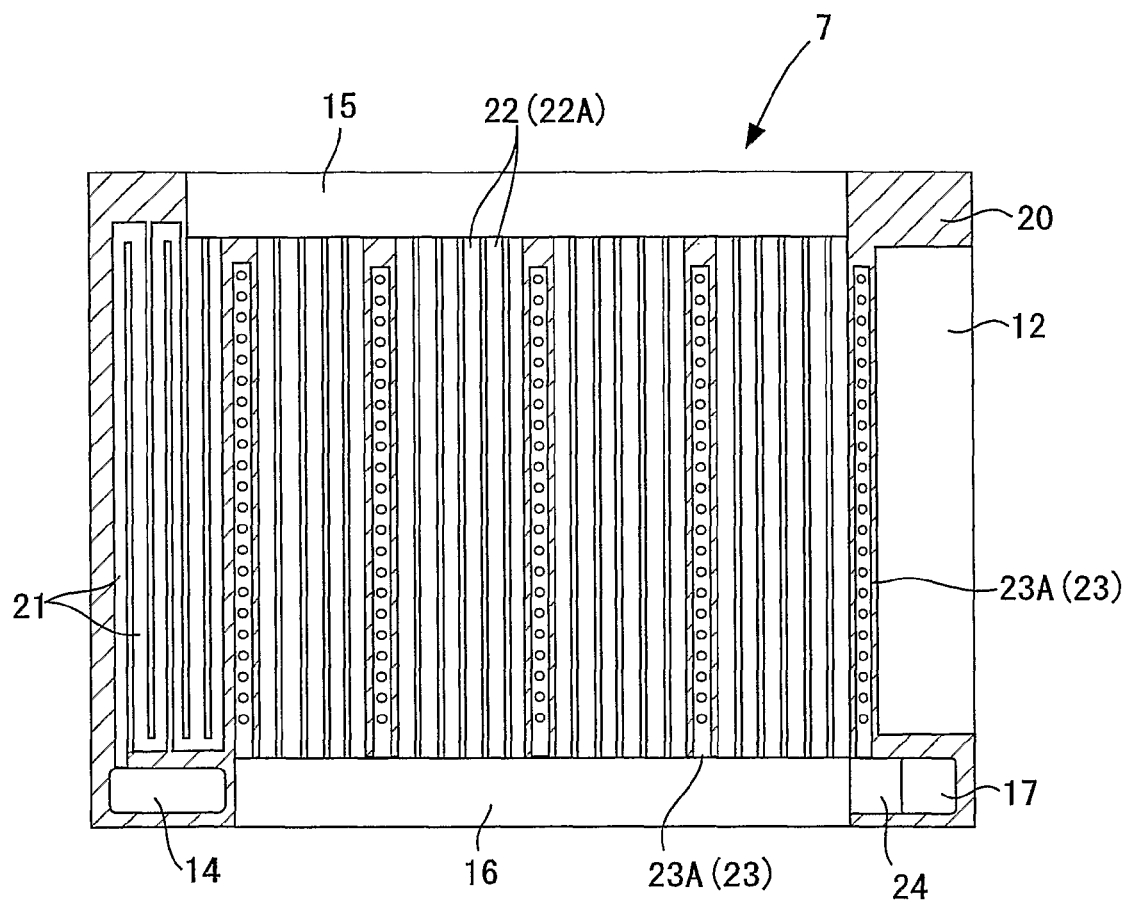
FIG. 4 is a cross-sectional plan view of a reforming element forming the fuel reforming unit.

Referring now to FIG. 4, the reforming element 7 is provided with an air manifold 12, starting material vapor manifold 15, starting material manifold 14, reformate gas manifold 16 and reformate gas outlet manifold 17 in the same arrangement as for the combustion element 8. Specifically, the air manifold 12, starting material vapor manifold 15, starting material manifold 14, reformate gas manifold 16 and reformate gas outlet manifold 17 of the reforming element 7, overlap with the same manifolds of the combustion element 8. The reforming element 7 is provided with starting material vaporization passages 21, reforming catalyst passages 22, plural supply passages 23 and an outlet passage 24.

The starting material vaporization passage 21 vaporizes a mixture of water and gasoline (i.e., mixture of water and fuel). The mixture is supplied as starting material to the starting material manifold 14. The starting material vaporization passage 21 supplies the mixture to the starting material vapor manifold 15 as a vapor of starting material. The plural reforming catalyst passages 22 carry out steam reforming of the starting material vapor from the starting material vapor manifold 15, and supply the resultant hydrogen-rich reformate gas to the reformate gas manifold 16. The plural supply passages 23 supply the reformate gas from the reformate gas manifold 16 to the supply holes 13 of the combustion element 8. The outlet passage 24 leads the reformate gas from the reformate gas manifold 16 to a reformate gas outlet manifold 17.

If the starting material vaporization passage 21 is viewed in the lamination direction of the fuel reforming unit 3, they intersect with the combustion gas passages 11 of the combustion element 8. That is, the starting material vaporization passage 21 passes under or over the combustion gas passages 11. The starting material vaporization passage 21 bends back plural times in the plane of the reforming element 7.

The mixture of water and gasoline which flows through the inside of the passage 21 is heated and vaporized by the heat energy transmitted from the adjacent combustion element 8 via the partition plate 6 and/or plate body 20 (10), and becomes starting material vapor.

Referring to FIG. 2 again, the combustion element 7 has first and second horizontal parts 73, 75 substantially perpendicular to the lamination direction, and vertical parts 74 extending substantially in the lamination direction from the horizontal part. The first horizontal parts 73 and vertical parts 74 define grooves 22A which form the reforming catalyst passages 22. The second horizontal parts 75 and vertical parts 74 define grooves 23A which form the supply passages 23. The second horizontal parts 75 of the combustion element 7 function as partitions arranged between reforming catalyst passages 22 and combustion gas passages 11. The first horizontal parts 73 of the combustion element 7 function as partitions arranged between the supply passages 23 and combustion gas passages 11. Further, the horizontal part 71 of the combustion element 8 functions as a partition arranged between the reforming catalyst passages 22 and combustion gas passages 11, and between the supply passages 23 and combustion gas passages 11.

If the plural reforming catalyst passages 22 are viewed in the lamination direction of the fuel reforming unit 3, they intersect with the combustion gas passages 11 of the combustion element 8. That is, the reforming catalyst passages 22 lie under or over the combustion gas passages 11. The reforming catalyst passages 22 are formed by plural grooves 22A and the partition plate 6 (or back surface of the plate body 10 of the combustion element 8) which covers the grooves 22A. The partition plate 6 functions as a partition arranged between the reforming catalyst passages 22 and combustion gas passages 11, and between the supply passages 23 and combustion gas passages 11. The ends of the reforming catalyst passages 22 open into the starting material vapor manifold 15 and reformate gas manifold 16.

The reforming catalyst adheres to the inner wall surfaces of the grooves 22A forming the plural reforming catalyst passages 22 and the surface of the partition plate 6. The reforming catalyst is a steam reforming catalyst which carries out steam reforming of a mixture of steam and gasoline (i.e., mixture of steam and fuel). When the starting material vapor is passed through the starting material vapor manifold 15, the reforming catalyst passages 22 carry out steam reforming of the hydrogen-rich reformate gas from the starting material vapor manifold 15, and supply the generated reformate gas to the reformate gas manifold 16. The steam reforming reaction is an endothermal reaction, and the steam reaction proceeds using the combustion heat transmitted by the combustion element 8 which is opposite to the combustion element 7 via the partition plate 6 and plate body 20 (10). The reforming reaction in the reforming catalyst passage 22 may also be an Autothermal Reforming type (hereafter, ATR type). The autothermal reforming type is a combination of a partial oxidation reaction which is a reaction of air and fuel, and a steam reforming reaction, wherein the heat of the partial oxidation reaction which is an exothermal reaction supplies the heat required for the steam reforming reaction which is an endothermal reaction, and reforming occurs without supply of heat from the combustion catalyst.

As shown in FIG. 2, the ends of the plural supply passages 23 open only into the reformate gas manifold 16, and are formed of plural grooves 23A arranged parallel to the reforming catalyst passages 22. The supply passages 23 are formed by covering the grooves 23A with the plate body 10 of the combustion element 8. The supply holes 13 provided in the plate body 10 of the combustion element 8 are connected to the supply passages 23, and the reformate gas of the reformate gas manifold 16 is supplied to the combustion gas passages 11 via the supply holes 13.

One of the supply passages 23 and a row of supply holes 13 connected thereto is arranged between the air manifold 12 and reforming catalyst passages 22 closest to the air manifold 12. Another one of the supply passages 23 is arranged between the starting material vaporization passages 21 and the reforming catalyst passages 22 closest to the starting material vaporization passages 21. Herein, the supply passages 23 and the rows of supply holes 13 are substantially parallel, and the plural supply holes 13 are arranged in a line along one combustion gas passage 11 in the flow direction of combustion gas. Also, instead of the reforming catalyst passages 22, the supply passages 23 each having the row of supply holes 13 may be disposed at a substantially predetermined interval between the starting material evaporation passages 21 and air manifold 12. In other words, the number of reforming catalyst passages 22 between adjacent supply passages 23 is substantially constant. Since the pressure of the combustion element 8 during operation is set lower than the pressure of the reforming element 7 during operation, the reformate gas of the reformate gas manifold 16 is supplied to the combustion gas passages 11 of the combustion element 8 via the plural supply passages 23 and the rows of supply holes 13 connected thereto.

In the combustion gas passages 11, reformate gas (combustible gas) is supplied at a predetermined interval in the flow direction of air and/or combustion gas. Thereby, the combustion temperature distribution in the combustion gas passages 11 is smoothed, and local increase of combustion temperature in any specific part is eliminated. Also, in order to maintain a high catalyst reaction rate, the temperature can be increased uniformly throughout the combustion gas passages 11, and local increase of combustion temperature in a specific part of the combustion gas passages 11 can be suppressed. Due to this, the combustion peak temperature can be reduced, the life of the reforming catalyst is extended, and the NOx discharge generated in proportion to combustion temperature is suppressed.

One of the supply passages 23, which is arranged between the starting material vaporization passages 21 and reforming catalyst passages 22 closest to the starting material vaporization passages 21, supplies reformate gas upstream of the combustion gas passages 11 adjacent to the starting material vaporization passages 21 of the combustion element 8. Due to the combustion heat generated by the combustion reaction in the combustion gas passage 11, generation of starting material vapor from the water-gasoline mixture in the starting material vaporization passages 21 of the reforming element 7, is promoted. In other words, the heat required for starting material vaporization can be supplied to the downstream part of the combustion gas passages 11 which is the heat source for the starting material vaporization passages 21, without locally raising the temperature of the combustion element 8 upstream.

The specific shape of the partition plate 6 is not shown, but it comprises the air manifold 12, starting material vapor manifold 15, starting material manifold 14, reformate gas manifold 16 and reformate gas outlet manifold 17 in the same arrangement as for the combustion element 8. In other words, the air manifold 12, starting material vapor manifold 15, starting material manifold 14, reformate gas manifold 16 and reformate gas outlet manifold 17 of the partition plate 6 overlap with the corresponding elements of the reforming element 7. The supply holes 13 are formed in plural parts where the combustion gas passages 11 of the combustion element 8 lie over or under the supply passages 23. In other words, each supply hole 13 is formed between a combustion gas passage 11 and a supply passage 23.

The combustion element 8, reforming element 7 and partition plate 6 are laminated in the order shown in FIG. 2 to form the fuel reforming unit 3. The fuel reformer 1 shown in FIG. 1 can be manufactured by laminating plural fuel reforming units 3 between the upper and lower end plates 2, 4, and tightening in the lamination direction.

As shown in FIG. 1, the fuel reformer 1 has a shape wherein the air manifold 12, starting material vapor manifold 15 and reformate gas manifold 16 are open to the outside. The starting material manifold 14 and reformate gas outlet manifold 17 are hidden inside, and communicate with the outside respectively via a starting material inlet 25 and reformate gas outlet 26.

In the fuel reformer 1 of this embodiment, in the reforming element 7 and partition plate 6, the oxidation catalyst is introduced and coated after lamination, from the side parallel to the lamination direction onto which the oxidation catalyst passages 11 open, without preliminarily coating, calcinating and supporting the oxidation catalyst and reforming catalyst prior to lamination. Likewise, the reforming catalyst is introduced and coated from the side parallel to the lamination direction onto which the reforming catalyst passages 22 open. In this way, the oxidation catalyst and reforming catalyst are respectively coated on the surface of the walls of the combustion gas passages 11 and reforming catalyst passages 22. The manifolds 12, 15, 16 are then sealed with a cover, and the catalyst is dried and calcinated.

The manufacturing sequence used to manufacture the fuel reformer 1 after lamination will now be described. First, an oxidation catalyst slurry comprising an oxidation catalyst, water and a binder is made to flow into the combustion gas passages 11 from the open air manifold 12 side, and the inner walls of the combustion gas passages 11 are thereby coated with the oxidation catalyst slurry. Likewise, a reforming catalyst slurry comprising a reforming catalyst, water and a binder is made to flow into the reforming catalyst passages 22 from the open starting material vapor manifold 15, and the inner walls of the reforming catalyst passages 22 are thereby coated with the reforming catalyst slurry. In this state, as the supply passages 23 are open only at the reforming manifold 16, the reforming catalyst slurry does not flow in the supply passages 23, and the supply holes 13 are sealed only by the oxidation catalyst slurry.

Next, the open starting material vapor manifold 15 and reformate gas manifold 16 are sealed by the covers 28, 29, the reformate gas outlet 26 which communicates with the reformate gas outlet manifold 17 is sealed, and the air manifold 12 is sealed by a cover 30 provided with an air inlet 27. In this state, the outlet of the combustion gas passages 11 and starting material inlet 25 are open. Pressurized air is supplied from the starting material inlet 25. The pressurized air flows into the supply passages 23 via the starting material manifold 14, starting material vaporization passage 21, starting material vapor manifold 15, reforming catalyst passage 22 and reformate gas manifold 16. The pressurized air then opens the supply holes 13 sealed by the oxidation catalyst slurry, reaches the combustion gas passages 11, and flows to the outside from the air manifold 12 and the outlet of the combustion gas passages 11 on the opposite side to the air manifold 12.

Subsequently, hot air is supplied from the starting material inlet 25 and air inlet 27, the oxidation catalyst of the combustion gas passages 11 and the reforming catalyst of the reforming catalyst passages 22 are calcinated, and water is eliminated from the catalyst slurry. Hence, the catalyst is coated and calcinated after laminating plural elements without the catalyst.

The method of operation the fuel reformer 1 will now be described. In the fuel reformer 1, air is supplied from the air inlet 27 and combustible gases, e.g., vaporized gasoline, are supplied from the air inlet 27 and/or the starting material inlet 25 when the reformate gas outlet 26 is closed, and burnt in the combustion gas passages 11 so that the fuel reformer 1 is warmed up. Combustion gas is then discharged as oxidation catalyst reaction gas from the outlet of the combustion gas passage 11. The combustible gas supplied from the air inlet 27 is burnt mainly in the upstream part of the combustion gas passage 11, and warms the upstream reforming elements 7. The combustible gas supplied from the starting material inlet 25 passes through the starting material vapor passages 21, starting material vapor manifold 15, reforming catalyst passages 22, reformate gas manifold 16 and supply passages 23, and is supplied from the supply holes 13 to the combustion gas passages 11. The combustible gas such as reformate gas is burnt over the whole length of the combustion gas passages 11 so as to warm all the reforming elements 7. Combustion gas is discharged as oxidation catalyst reaction gas from the outlet of the combustion gas passage 11.

As warming up proceeds, the supply gas from the air inlet 27 is changed over to air only. Simultaneously, a liquid starting material, e.g., a gasoline and water mixture, is supplied from the starting material inlet 25. The liquid starting material changes to starting material vapor (vapor of starting material) when it passes through the starting material vaporization passages 21, and the starting material vapor reaches the starting material vapor manifold 15. Next, the starting material vapor changes to reformate gas when it passes through the reforming catalyst passage 22, and the reformate gas reaches the reformate gas manifold 16. The reformate gas is supplied to the combustion gas passages 11 via the supply passages 23 and supply holes 13. The reformate gas burns throughout the combustion gas passages 11, and all the reforming elements are warmed up.

When the temperature of the elements reaches a warmup completion temperature, the supply amount of liquid starting material is increased to a specified amount, and reformate gas is discharged from the reformate gas outlet 26 while maintaining the operating pressure of the reforming elements 7. For example, supply of reformate gas to the fuel cell or a storage means can be started.

As for the oxidation catalyst reaction gas (or combustion gas) discharged from the outlet of the combustion gas passages 11, it is preferred to recover the water and the heat contained in the oxidation catalyst reaction gas via a radiator, not shown.

In this embodiment, the following advantage can be obtained.

At least part of the reformate gas is supplied to plural sites of the combustion gas passages 11 at a predetermined interval in the combustion gas flow direction of the combustion elements 8, so the temperature distribution of the reforming elements 7 is equalized. Also, a high temperature can be maintained throughout all of the reforming elements, so the reaction temperature of the reformate gas can be maintained high, and reforming can be efficiently performed using a small amount of reforming catalyst. In the prior art, in order to lower the combustion peak temperature, it is necessary to increase the air mixing ratio. However, in this embodiment, it is possible to lower the combustion peak temperature with a small air volume. Hence, the required heat radiation amount from the radiator which recovers water contained in the combustion gas can be reduced, and the radiator can be made more compact.

Since the reforming catalyst passages 22 which reform starting material vapor and the supply passages 23 which supply reformate gas to the combustion gas passages 11 (or combustion gas passages) can be installed substantially in the same plane parallel to each other, the reforming elements and combustion elements 8 can be laminated.

The supply passages 23 open into the reformate gas manifold 16, and reformate gas from the reformate gas manifold 16 is supplied to the combustion passages 11 of the combustion elements 8 via the supply passages 23 and supply holes 13. Consequently, generation of reformate gas and multistage supply of the generated reformate gas to the combustion elements 8 can be performed by one layer of the reforming elements 7.

The plural supply passages 23 of the reforming elements 7 and the plural combustion gas passages 11 of the combustion elements 8 are disposed such that the plural supply passages 23 lie under or over the plural combustion gas passages 11. Reformate gas can thus be supplied at plural positions in each combustion gas passage 11 of the combustion elements 8.

Liquid starting material from the starting material manifold 14 is vaporized by the starting material vaporization passages 21, and is introduced to the starting material vapor manifold 15. As a result, starting material vapor is generated from the starting material by heat supplied by the combustion elements 8.

The supply passages 23 and supply holes 13 are arranged so that reformate gas is supplied upstream from the combustion gas passages 11 adjacent to the starting material vaporization passages 21 of the reforming elements 7. Heat can thus be supplied to the starting material vaporization passages 21 without raising the temperature of the combustion elements 8 more than is required.

The reforming catalyst passages 22 are formed by plural grooves 22A, and the partition plate 6 covering the opening part of the grooves 22A or the plate body 10 of the combustion elements 8. The surface area of the reforming catalyst passages 22 therefore increases, the catalyst amount which can be supported increases, and heat transfer from the combustion elements 8 is promoted. Mechanical strength can also be improved.

The combustion gas passages 11 of the combustion elements 8 are formed by plural grooves 11A, and the partition plate 6 covering the open part of the grooves 11A or the plate body 20 of the reforming elements 7. The surface area of the combustion gas passages 11 therefore increases, the catalyst amount which can be supported increases, and heat transfer to the reforming elements 7 is promoted. Mechanical strength can also be improved.

The wall surfaces of the combustion gas passages 11 of the combustion elements 8 support an oxidation catalyst. Hence, combustion of reformate gas and/or added fuel in the combustion gas passages 11 proceeds without fail. Since the catalyst is close to the surface of the structural members 10 forming the combustion gas passages 11, the combustion amount in the vicinity of the members 10 increases, and heat conduction to the reforming elements 7 is promoted.

Since the pressure of the combustion elements 8 during operation is set lower than the pressure of the reforming elements 7 during operation, reformate gas can be supplied from the reforming elements 7 to the combustion elements 8.

The air manifold 12, starting material vapor manifold 15 and reformate gas manifold 16 are formed in an open state when plural elements are laminated together, and are sealed by sealing members (covers) 28-30.

The fuel reformer 1 can easily be manufactured by coating the catalyst on the passages 21, 22 after laminating the elements, and then sealing them.

FIG. 5-FIG. 9 show a second embodiment of the fuel reformer. In this embodiment, the combustion temperature can be independently controlled for each region in the flow direction. Identical devices to those of the first embodiment are assigned identical symbols, and their description is omitted for simplicity.

Figure 5:
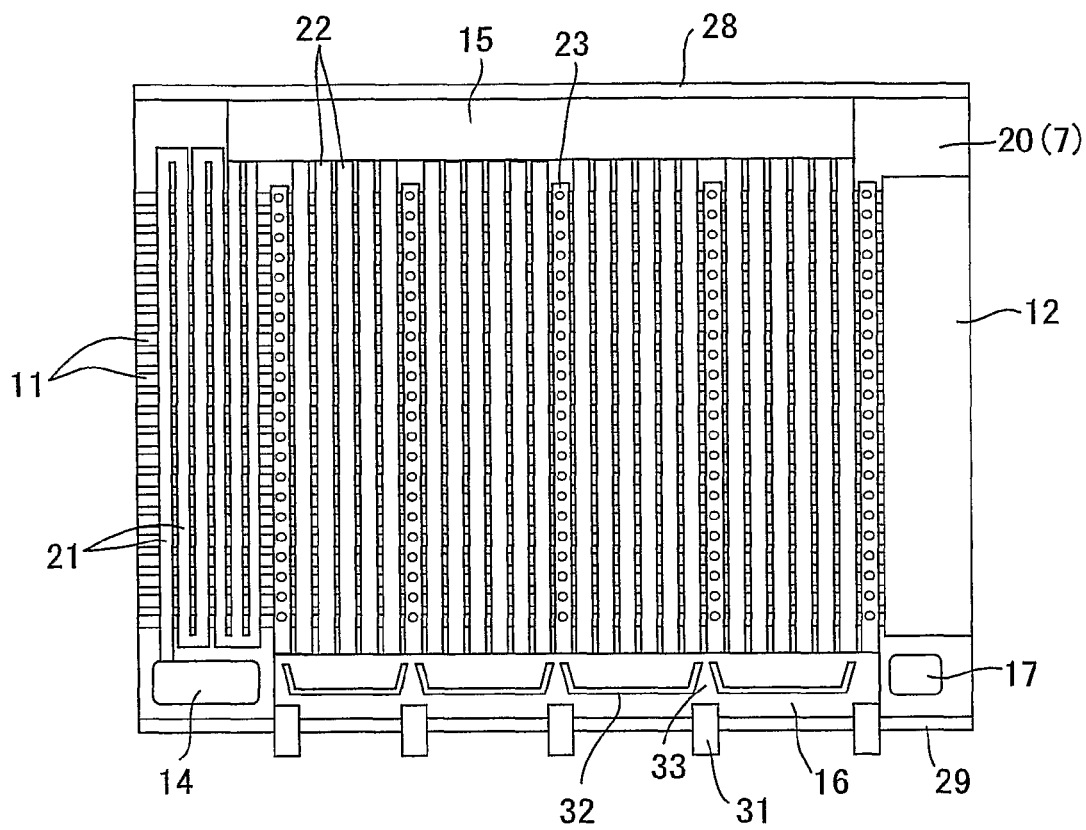
FIG. 5 is a plan transparent diagram of a reforming element according to a second embodiment.
Figure 6:
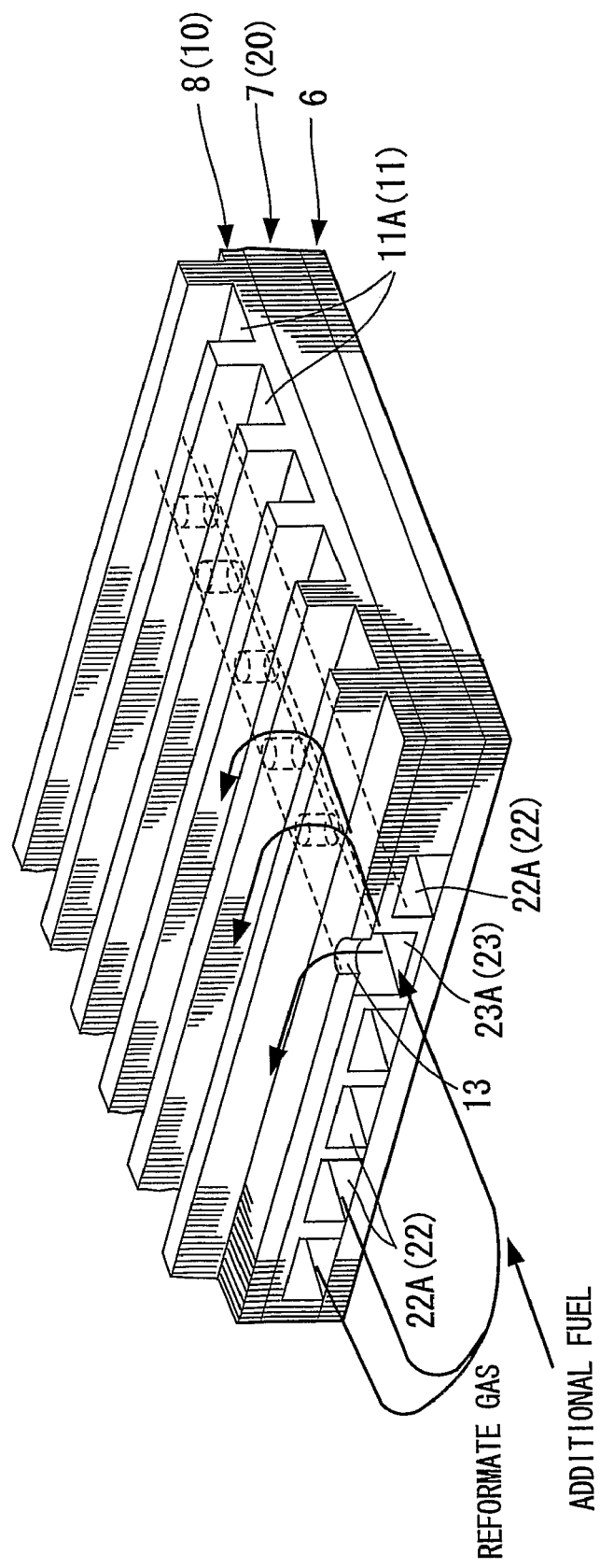
FIG. 6 is a partial perspective view of the fuel reforming unit.
Figure 7:
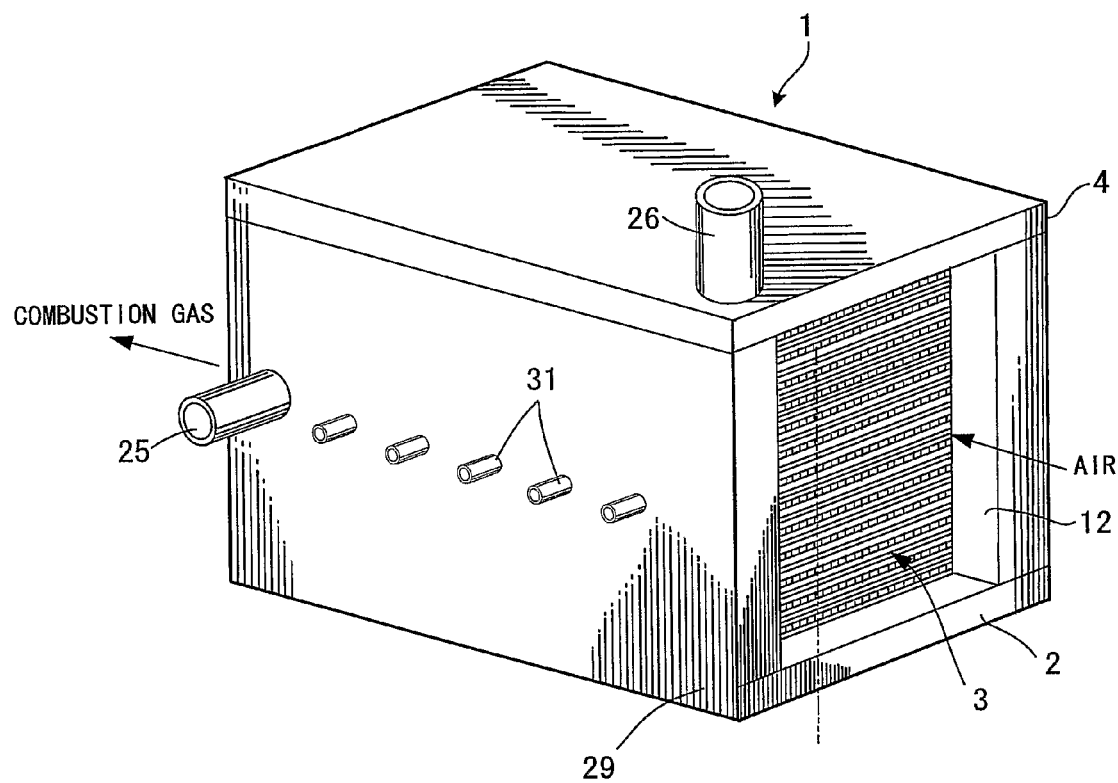
FIG. 7 is a full perspective view of the fuel reformer.

Referring to FIG. 5, the fuel reformer is provided with an additional fuel introduction means which comprises plural fuel injectors 31 in the cover 29 facing the opening to the reformate gas manifold 16 of the supply passages 23. In the reformate gas manifold 16, a fuel guide 32 which forms taper holes 33 which guide additional fuel injected by the fuel injectors 31 to the supply passages 23, is disposed between the fuel injectors 31 and the openings of the supply passages 23.

Therefore, the additional fuel injected from the fuel injectors 31 is guided to the taper holes 33 of the fuel guide 32 and introduced to the openings of the supply passages 23 to be vaporized. In this way, additional fuel gas is added to the reformate gas. These gases are supplied to the combustion gas passages 11 from the supply passages 23 and supply holes 13,. and both the additional fuel and reformate gas are burnt in the combustion gas passages 11 downstream of the supply holes 13. Hence, the combustion temperature rises partially in the combustion gas passages 11 downstream of the supply holes 13. The rise of combustion temperature is transmitted to adjacent reforming elements 7, and the temperature of the reforming catalyst passages 22 is increased.

For example, the temperature of the reforming catalyst passages 22 between the supply passages 23 is measured by a temperature sensor. Additional fuel is injected from a fuel injector 31 facing the supply passage 23 disposed on the air manifold side with respect to the reforming catalyst passages 22 which are at a lower temperature than the lower limiting temperature for the reforming catalyst reaction. The required fuel supply amount may be determined from the temperature of the reforming catalyst passages 22. Hence, temperature control can be independently performed for each partial region in the flow direction of the combustion elements 8.

Additional fuel can be injected not only from the fuel injectors 31 facing the supply passages 23 of one combustion element 7, but also from the fuel injectors 31 facing the supply passages 23 of adjacent reforming elements 7 to said one combustion element 7. The taper holes 33 of the fuel guide 32 may be connected to one another to form a slit.

Since the oxidation catalyst reaction gas discharged from the outlet of the combustion gas passages 11 is at high temperature, the oxidation catalyst reaction gas must be passed through a radiator to recover water and heat contained therein.

Figure 8:
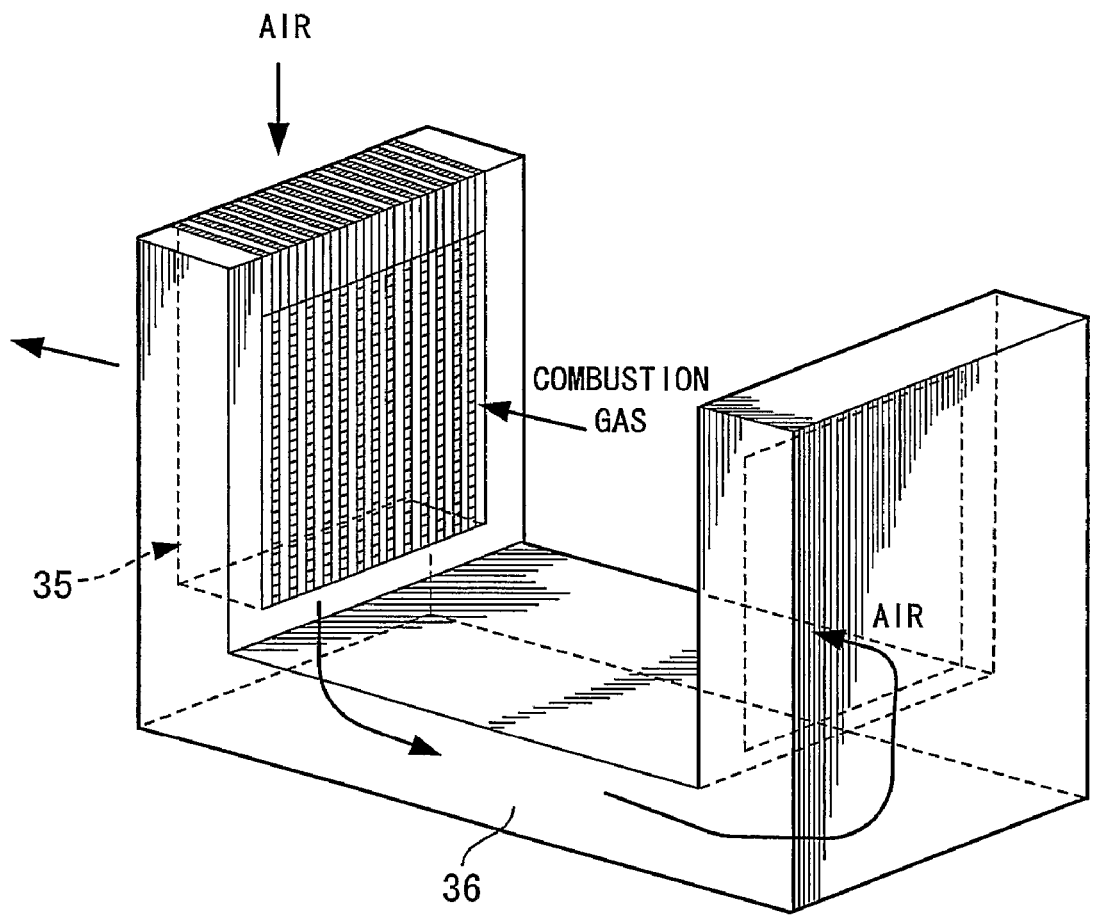
FIG. 8 is a perspective view of an air supply heating device.
Figure 9:
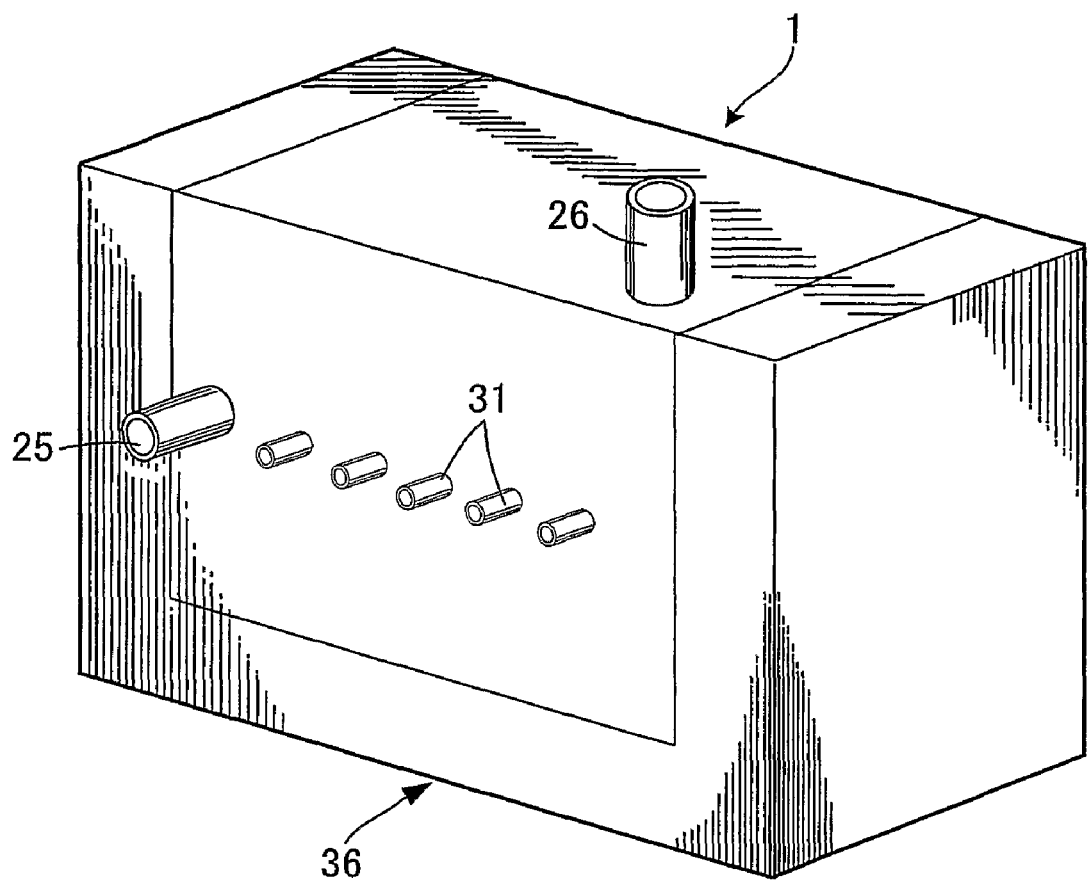
FIG. 9 is a total perspective view of a fuel reformer installed in the heating device.

As shown in FIGS. 8 and 9, inlet air may also be heated by the oxidation catalyst reaction gas. Specifically, an air introduction passage 36 which introduces external air into the air manifold 12 of the fuel reformer 1 via a heat exchanger 35 may be attached to the fuel reformer 1. As shown in FIG. 9, oxidation catalyst reaction gas may be discharged via the heat exchanger 35 (one heat exchange passage). Subsequently, oxidation catalyst reaction gas passes through the radiator to recover water and heat contained therein. External air which passed through another heat exchange passage of the heat exchanger 35 is heated by heat exchange with the oxidation catalyst reaction gas, and is introduced into the air manifold 12 of the fuel reformer 1. The heat dissipation amount required of the radiator can thus be made smaller, and the radiator can be made compact. Since heated air is introduced into the combustion gas passages 11, the oxidation catalyst reaction temperature of the fuel reformer 1 can be increased and stabilized.

FIG. 10-FIG. 13 show a third embodiment of the fuel reformer. In this embodiment, the reformate gas amount supplied to the combustion elements is equalized at each position in the combustion gas flow direction. Identical devices to those of the first and second embodiments are assigned identical symbols, and their description will be omitted for simplicity.

Figure 10:
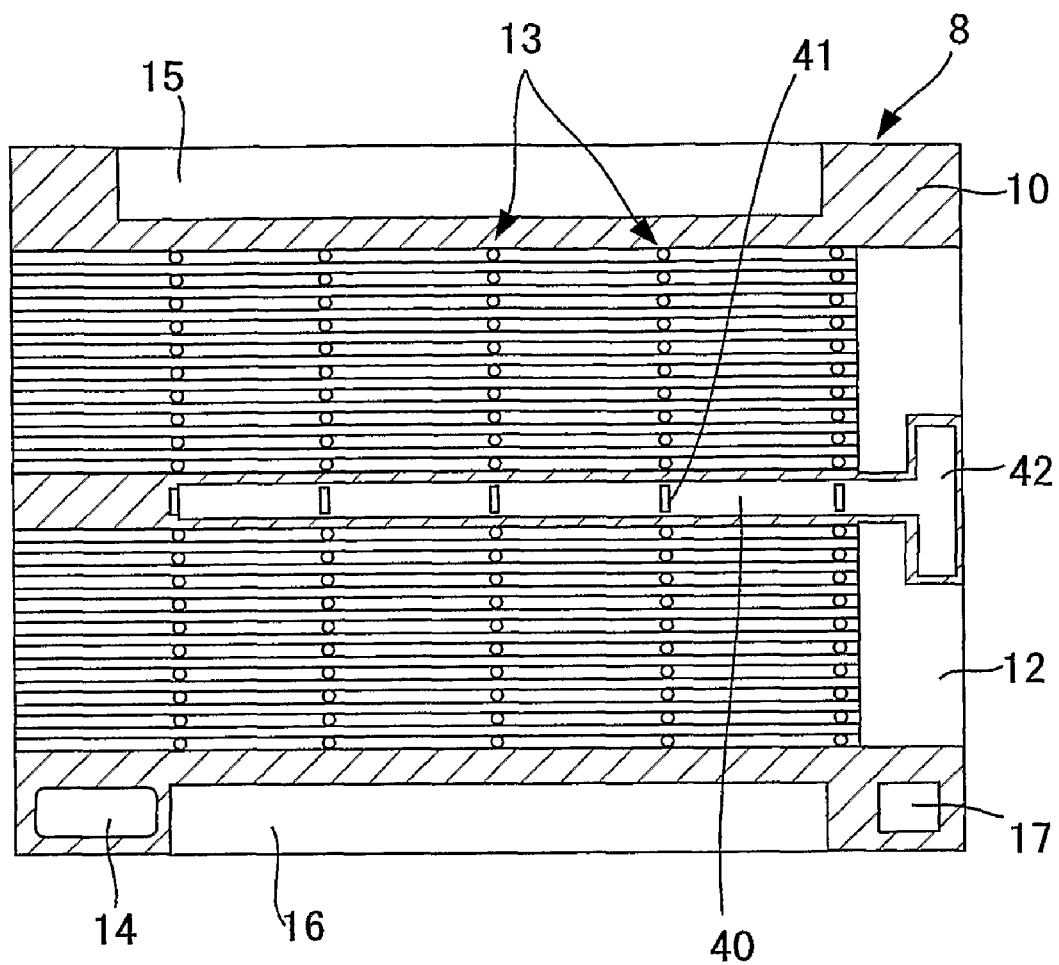
FIG. 10 is a cross-sectional plan view of a combustion element of a fuel reformer according to a third embodiment.

Referring to FIG. 10, a main passage 40 which is parallel to the combustion gas passages 11 is arranged substantially in the center of the group of the plural combustion gas passages 11. Plural distribution grooves 41 respectively connected with one supply passage 23 of the reforming elements 7, are provided in the bottom of the main passage 40. The supply passages 23 do not have openings which communicate with the reformate gas manifold 16, as described later. Reformate gas and/or additional fuel from a distribution manifold 42 in the air manifold 12 are supplied to the main passage 40. Liquid fuel is gasified in the main passage 40. The reformate gas and/or additional fuel are supplied to the supply passages 23 via the distribution grooves 41. The distribution amount supplied to the supply passages 23 is adjusted by the passage cross-sectional area of the distribution grooves 41.

Figure 11:
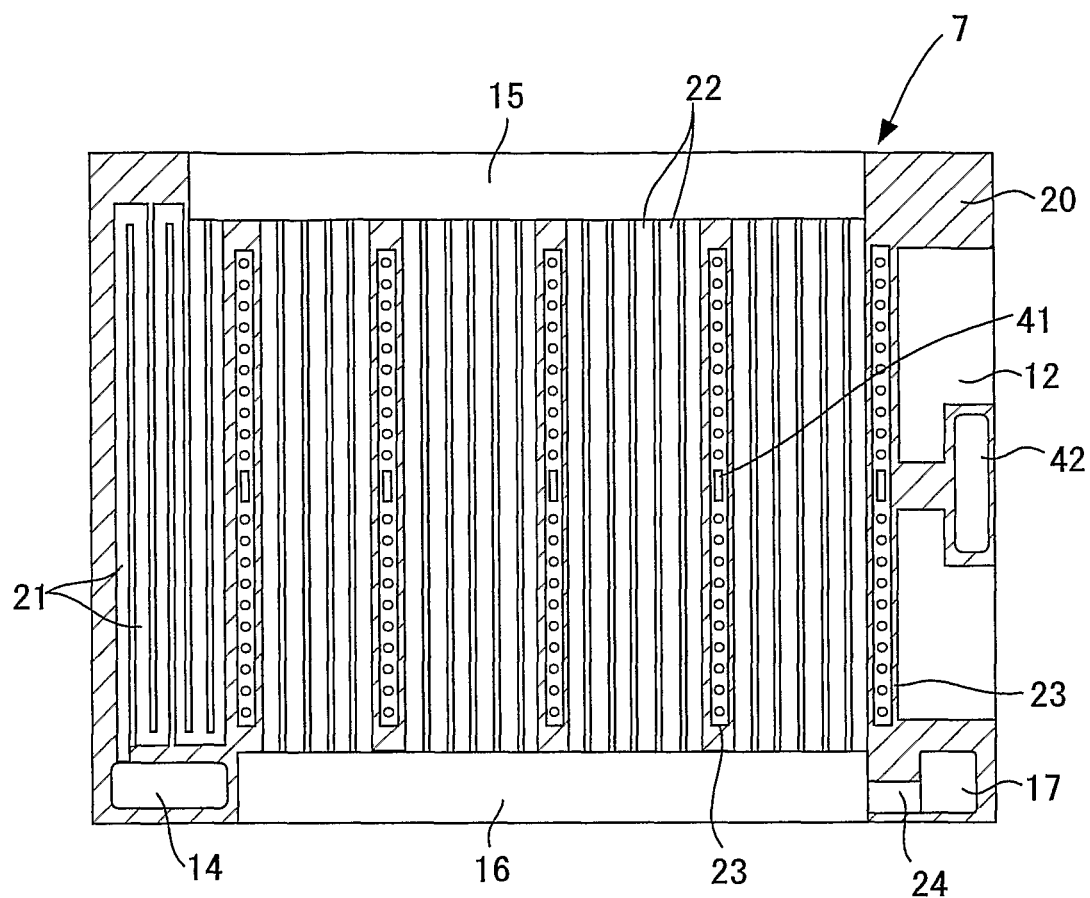
FIG. 11 is a cross-sectional plan view of a reforming element.

As shown in FIG. 11, both longitudinal ends of the grooves 23A forming the supply passages 23 of the reforming elements 7 are sealed, and do not open into the reformate gas manifold 16 and starting material vapor manifold 15. When the combustion element 8 is laminated on the reforming elements 7, the supply passages 23 closed at both longitudinal ends are formed. The distribution manifold 42 formed of holes which do not communicate with other space in the reforming elements 7, is formed in the air manifold 12.

Figure 12:
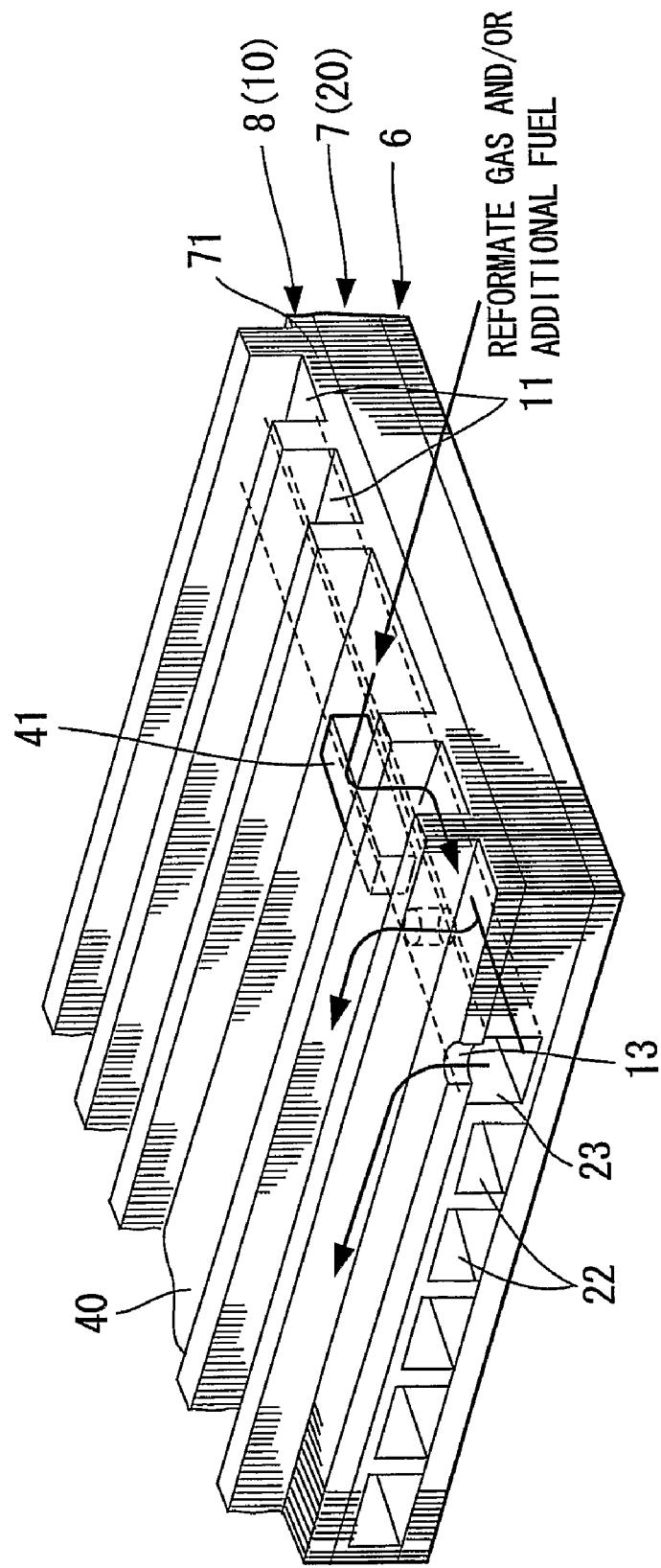
FIG. 12 is a partial perspective view of a fuel reforming unit.

Referring to FIG. 12, when the reforming element 7 and combustion element 8 are laminated on the partition plate 6, additional fuel and/or reformate gas supplied from the distribution manifold 42 are supplied to the supply passages 23 of the reforming elements 7 via the distribution grooves 41 and the main passage 40. Additional fuel and/or reformate gas are then supplied to the combustion gas passages 11 of the combustion elements 8 via the supply holes 13 of the supply passages 23. In the partition plate 6, manifolds are formed with an identical arrangement to that of the laminated reforming elements 7 and combustion elements 8. The distribution grooves 41 are formed in parts of the combustion elements 8 where the main passage 40 of the combustion elements 8 lies over or under the supply passages 23 of the reforming elements 7. That is, the distribution grooves 41 are formed between the main passage 40 and supply passages 23. The supply holes 13 are respectively formed in parts of the combustion elements 8 where the combustion gas passages 11 of the combustion elements 8 lie over the supply passages 23 of the reforming elements 7.

Figure 13:
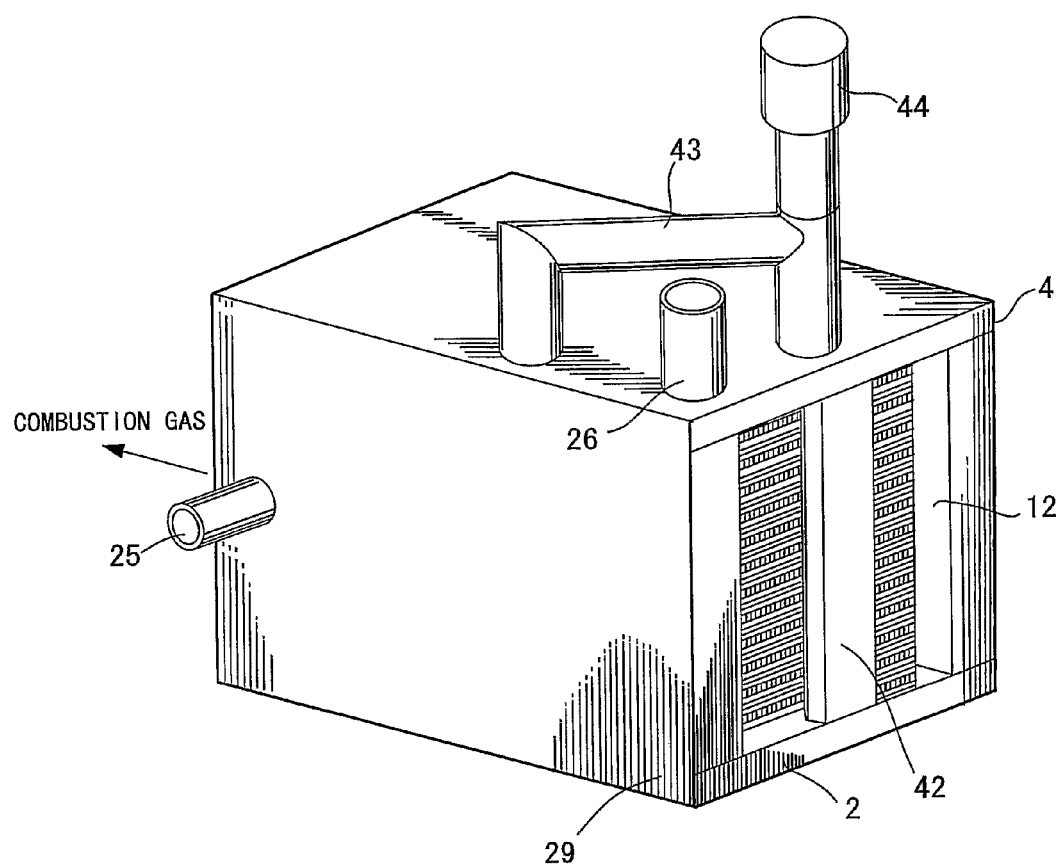
FIG. 13 is a full perspective view of the fuel reformer in an assembled state.

Referring now to FIG. 13, a connecting passage (external pipe) 43 which connects the reformate gas manifold 16 and distribution manifold 42, is provided above the end plate 4, and reformate gas from the reformate gas manifold 16 is supplied to the distribution manifold 42. A fuel injector 44 which supplies liquid fuel to the distribution manifold 42 is further disposed in the connection passage 43.

The reformate gas supplied via the connecting passage 43 and distribution manifold 42 is heated in the main passage 40 which is at high temperature due to the combustion reaction in the oxidation catalyst passages 11 of the combustion elements 8. The reformate gas is then supplied to the supply passages 23 of the reforming elements 7 via the distribution grooves 41. Reformate gas is uniformly supplied to the oxidation catalyst passages 11 via the supply holes 13 from the supply passages 23.

As the main passage 40 is at high temperature, as described above, even if fuel is injected from the fuel injector 44 in the liquid state, fuel in the main passage 40 can be vaporized without fail. The additional vaporized fuel is supplied together with reformate gas to the combustion gas passages 11 via the supply holes 13, the supply passages 23 and the distribution grooves 41, and thus the overall temperature of the fuel reformer 1 is raised according to the additional fuel amount. The additional fuel amount is computed by measuring the temperature of the reforming catalyst so that the minimum temperature of the reforming catalyst is greater than the minimum reaction temperature.

This embodiment has the following advantages in addition to those of the aforesaid first embodiment.

The reformate gas of the reformate gas manifold 16 is supplied to the main passage 40 of the combustion elements 8 via the distribution manifold 42, is introduced from the main passage 40 to the supply passages 23 via the distribution holes 41, and supplied to the combustion gas passages 11 of the combustion elements 8 via the supply holes 13. Hence, fuel is supplied uniformly to the left and right to all the combustion gas passages 11 from the distribution manifold 42.

Since the reformate gas is heated in the main passage 40 of the combustion elements 8 which are at high temperature, if additional fuel is added to the reformate gas, vaporization of the additional fuel is promoted.

The distribution manifold 42 and reformate gas manifold 16 are made to communicate by the external pipe 43 outside the fuel reformer 1. Hence, reformate gas can be delivered from the reforming elements 7 to the distribution manifold 42.

The fuel injector 44 which is an additional fuel supply means to supply additional fuel, is installed in the distribution manifold 42 or external pipe 43 which connects with the main passage 40. Hence, after promoting mixing of additional fuel and reformate gas in the distribution manifold 42, the additional fuel and reformate gas can be uniformly supplied to the main passages 40.

FIG. 14-FIG. 22 show a fourth embodiment of the fuel reformer. In this embodiment, a hydrogen separation membrane element is applied to the first and second embodiments to separate hydrogen-rich gas from the reformate gas before supply. Identical devices are assigned identical symbols to those of the first and second embodiments, and their description is omitted here for simplicity.

Figure 14:
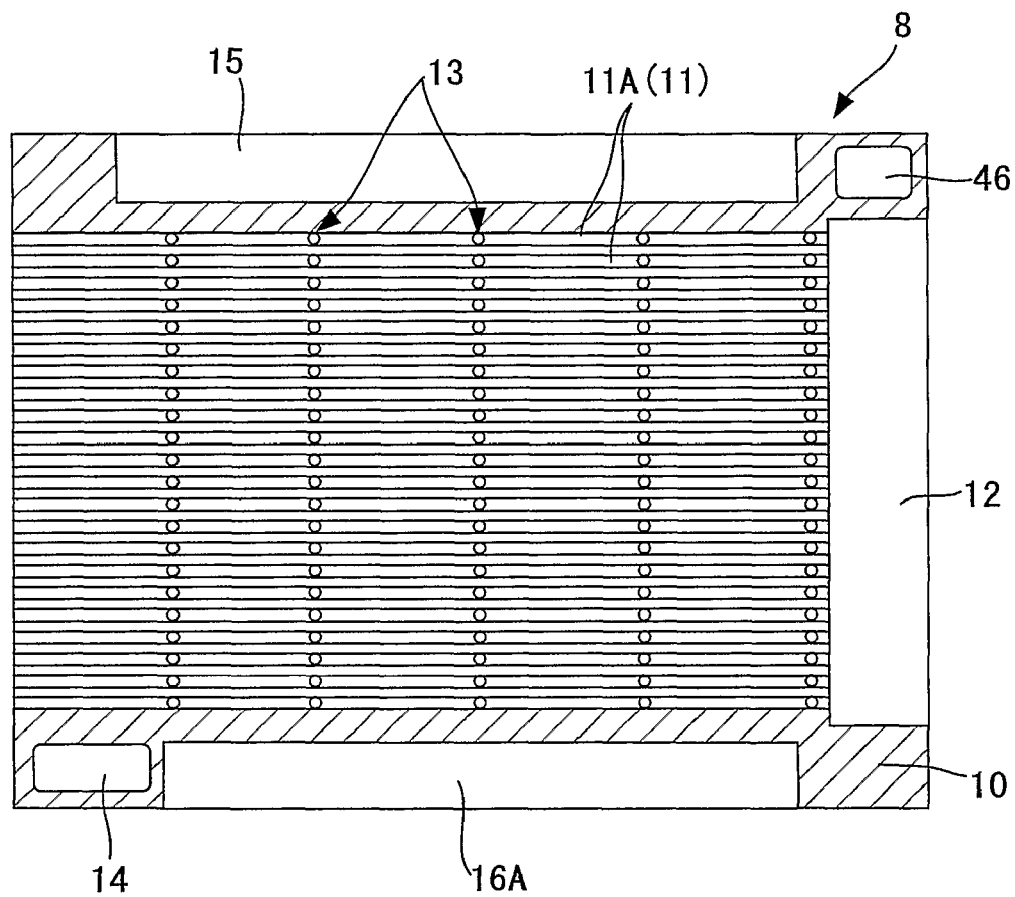
FIG. 14 is a cross-sectional plan view of a combustion element of a fuel reformer according to a fourth embodiment.

In FIG. 14, the combustion elements 8 of this embodiment basically have an identical construction to that of the first and second embodiments. However, the reformate gas manifold is omitted, and a hydrogen-rich gas manifold 46 is newly installed in the combustion elements 8. The hydrogen-rich gas manifold 46 is formed of a hole on the side of the air manifold 12.

Figure 15:
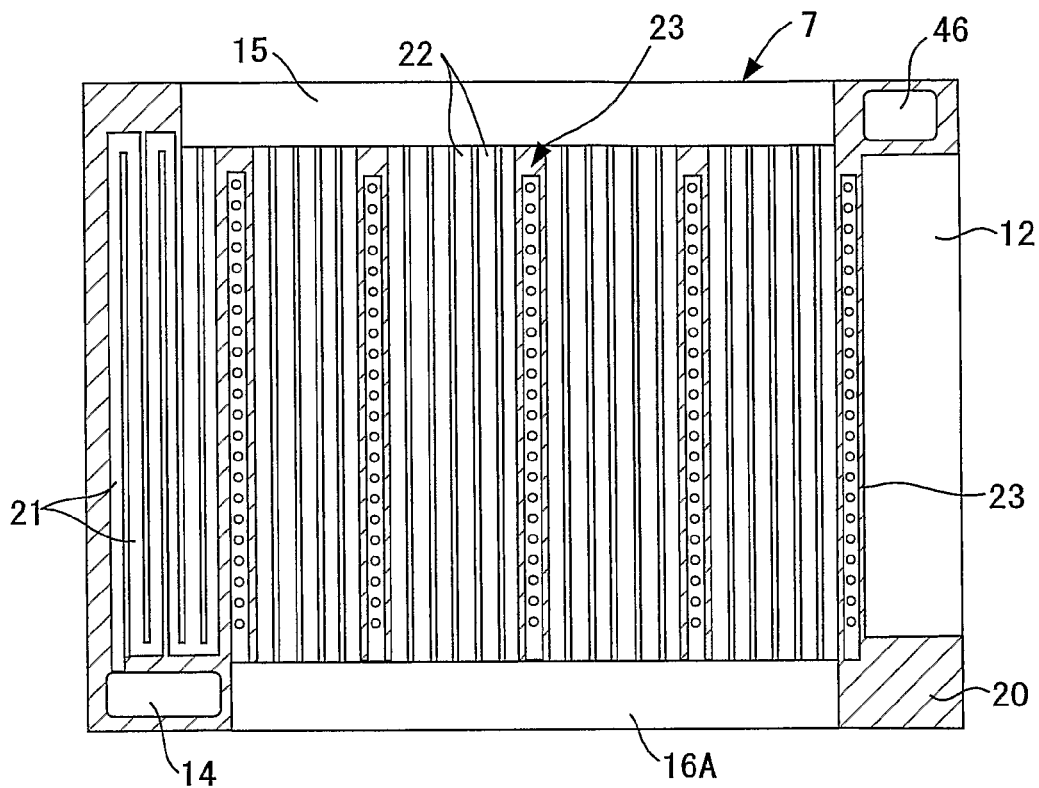
FIG. 15 is a cross-sectional plan view of a reforming element.

Referring to FIG. 15, the reforming elements 7 basically have an identical construction to that of the first and second embodiments. However, the reformate gas manifold is omitted, and the hydrogen-rich gas manifold 46 is newly installed in the reforming elements 7.

The hydrogen separation membrane element 48 newly installed in this embodiment basically comprises two plates separated by an interval by interposing plural supports between the two plates. Each plate has plural small holes. These plates are surrounded by a frame 49 which forms the manifolds. The hydrogen separation membrane covers the plate surface and the openings of the plural small holes, and the space between the plates forms a hydrogen-rich gas passage.

Figure 16:
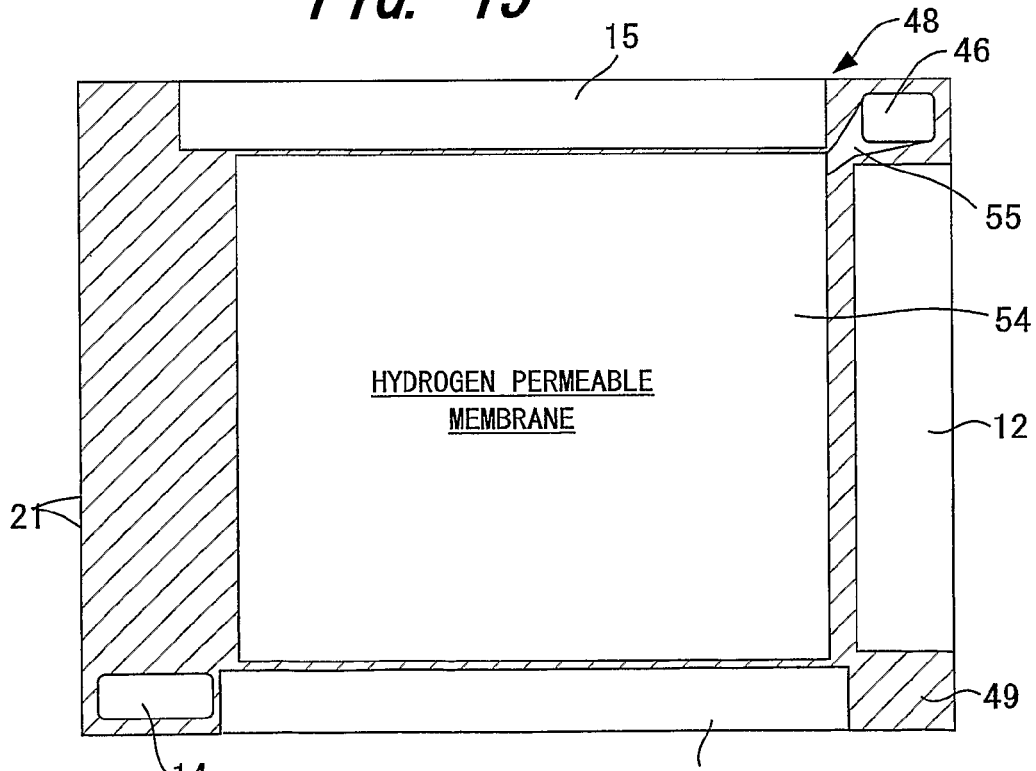
FIG. 16 is a plan view of a hydrogen separation membrane element.

Referring to FIG. 16, the frame 49 of the hydrogen separation membrane element 48 has a similar structure to that of the combustion elements 8 and reforming elements 7, and comprises a starting material manifold 14, starting material vapor manifold 15, reformate discharge gas manifold 16A, air manifold 12 and hydrogen-rich gas manifold 46. The frame 49 may be made of stainless steel.

Figure 17:
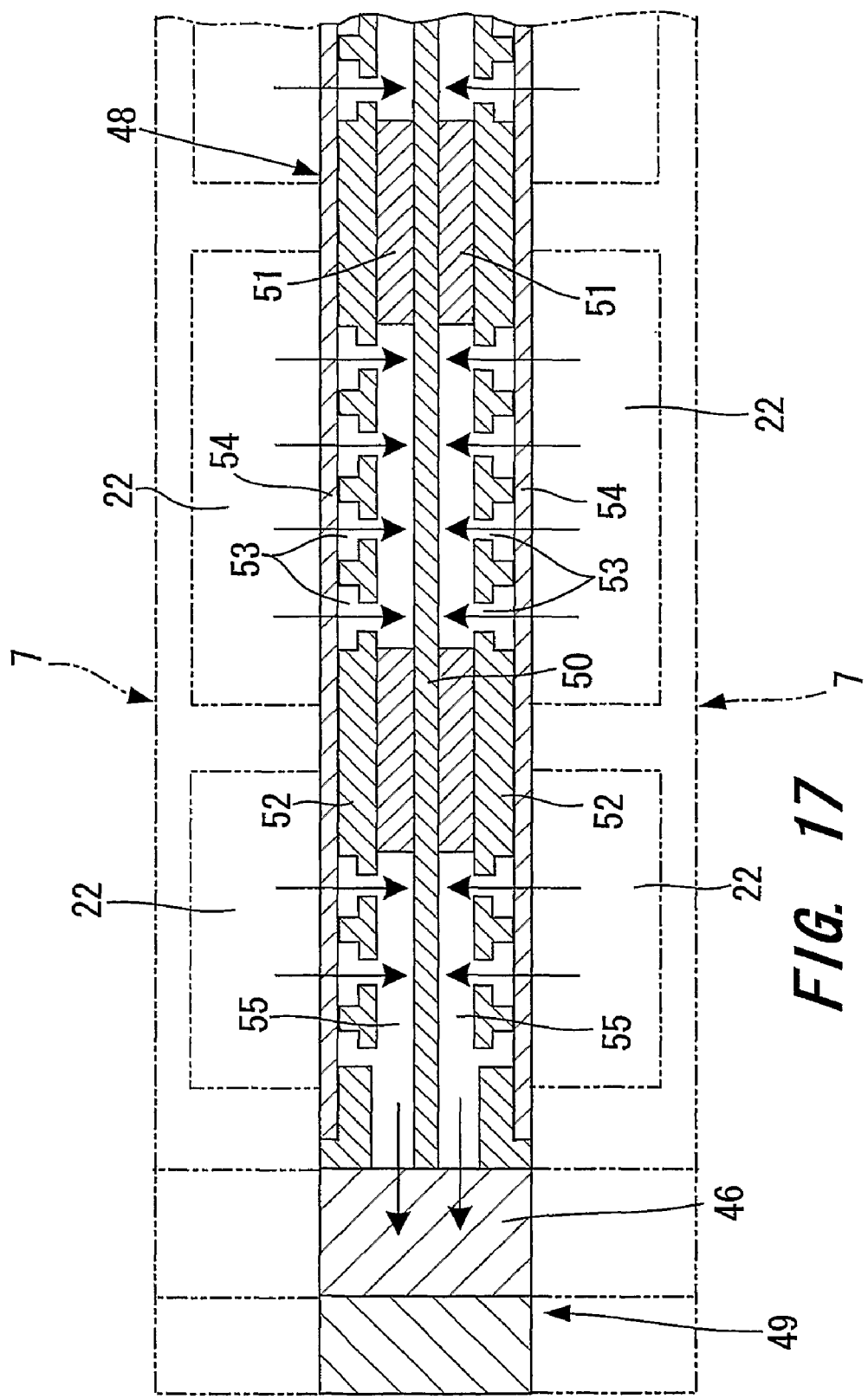
FIG. 17 is a partial cross-sectional view of a first example of a hydrogen separation membrane element.

Referring to FIG. 17, the hydrogen separation membrane element 48 comprises a thin base plate 50 formed in one piece with the frame 49 and disposed in the middle part in the lamination direction of the surrounding frame 49. Plural supports 51 are disposed (e.g., at a predetermined interval) in concave spaces defined by the frame 49 and base plate 50. A plate 52 having plural small holes 53 is fixed to and supported by the plural supports 51 by laser welding or diffusion welding. The supports 51 and plates 52 may be made of stainless steel. The plural small holes 53 in the plates 52 may be formed by chemical etching or the like. Before assembling the supports 51 and plates 52 in the concave spaces, they may be joined together beforehand by welding or the like.

The surfaces of the plates 52 having plural small holes 53 are coated with a palladium slurry comprising palladium (Pd), water and a binder, and dried to form a palladium foil coating. For example, the palladium slurry is coated to a thickness of 1-10 µm. The palladium foil is a hydrogen permeable membrane 54 having palladium (Pd) as the main component. The spaces between the plates 52 and the base plate 50 form a hydrogen-rich gas passage 55. The supports 51 function as spacers between the plates 52 and the base plate 50. The concave spaces on both sides of the base plate 50 form the hydrogen-rich gas passage 55. The hydrogen-rich gas passage 55 communicates with the hydrogen-rich gas manifold 46 provided in the frame 49.

The hydrogen separation membrane element 48 is installed such that it is gripped by the adjacent reforming elements 7, as shown by the dotted line in the figure, and functions as a cover for the reforming catalyst passages 22 (grooves 22A) of the reforming elements 7.

The reforming catalyst passages 22 of the reforming elements 7 are set at relatively high pressure, and the pressure applied to the hydrogen permeable membrane 54 is borne by the plates 52 supported by the supports 51.

Figure 18:
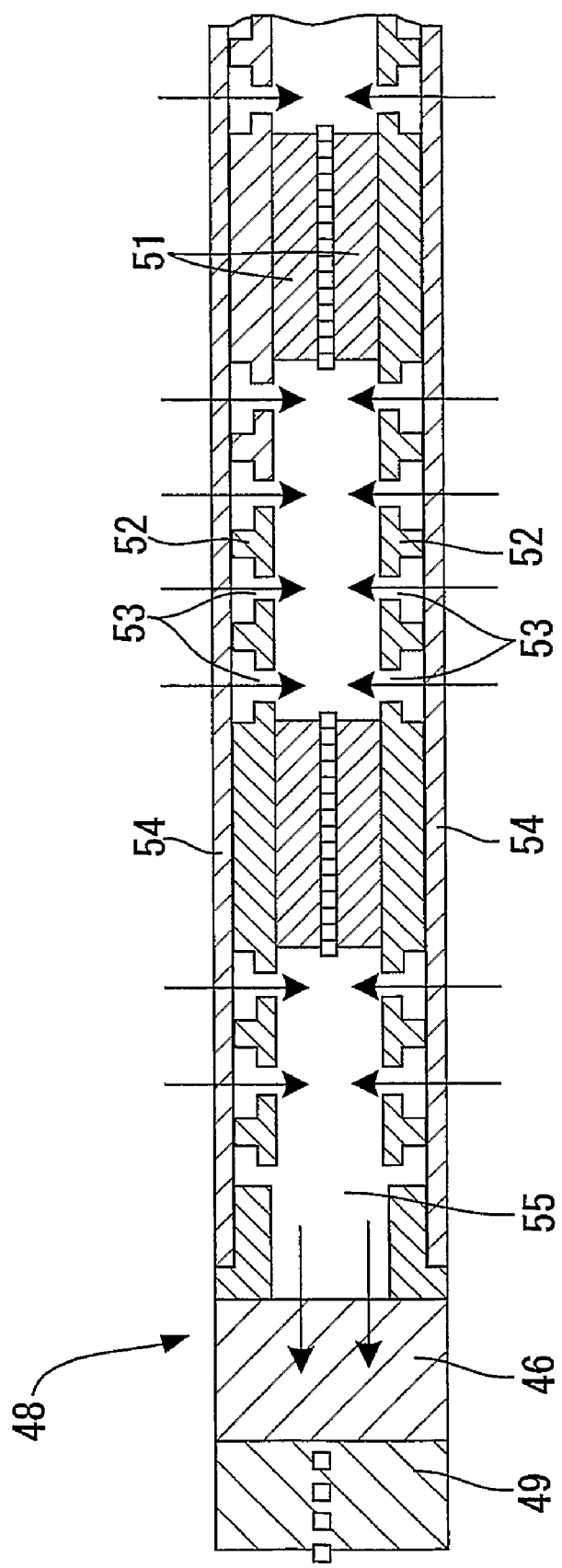
FIG. 18 is partial cross-sectional view of a second example of a hydrogen separation membrane element.

The hydrogen separation membrane element 48 may be formed as shown in FIG. 18. Referring to FIG. 18, in the hydrogen separation membrane element 48, the plates 52, the plural supports 51 and the frame 49 are joined together by welding so that they are symmetrical with respect to the center plane of the hydrogen separation membrane element 48. The ends of the supports 51 facing each other are in mutual contact, and are diffusion welded. The ends of the frame 49 facing each other are in mutual contact, and are diffusion welded. As in the case of FIG. 17, the hydrogen separation membrane 54 is formed on the surfaces of the plates 52, and spaces formed by the supports 51 between the plates 52 form the hydrogen-rich gas passage 55.

Figure 19:
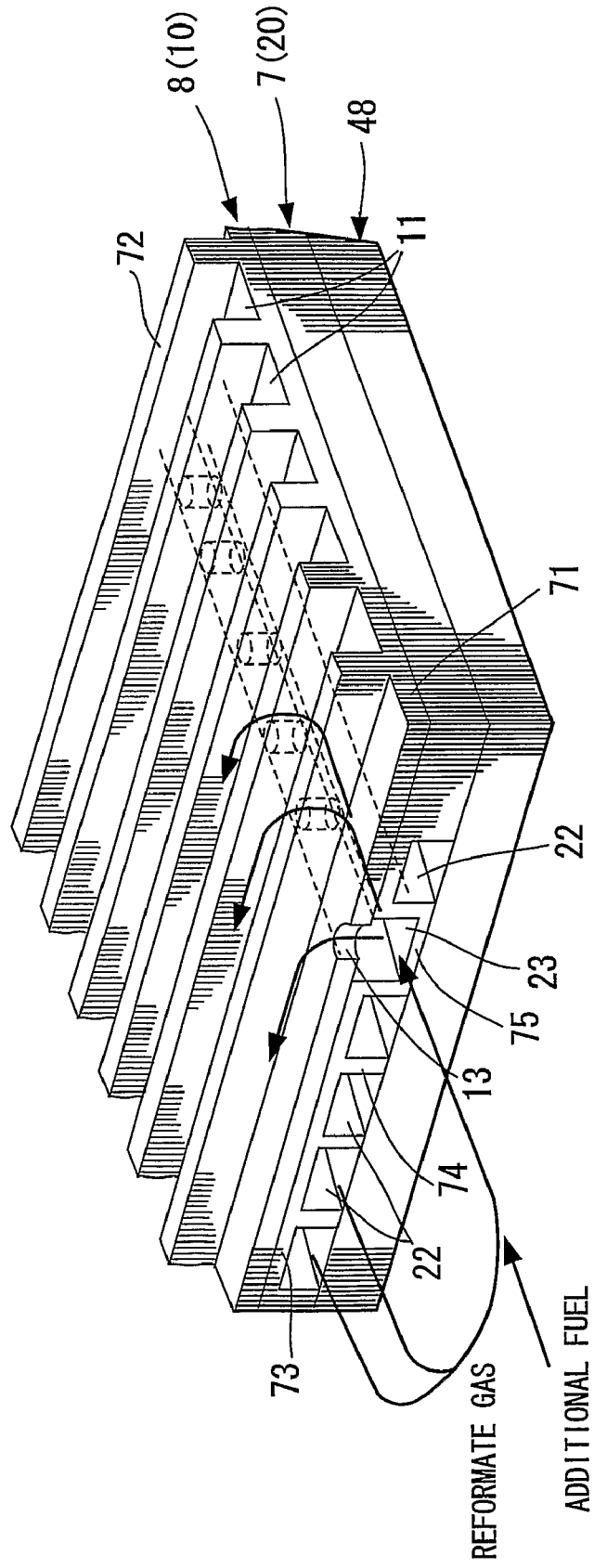
FIG. 19 is a perspective view showing the laminated construction of the fuel reformer.
Figure 20:
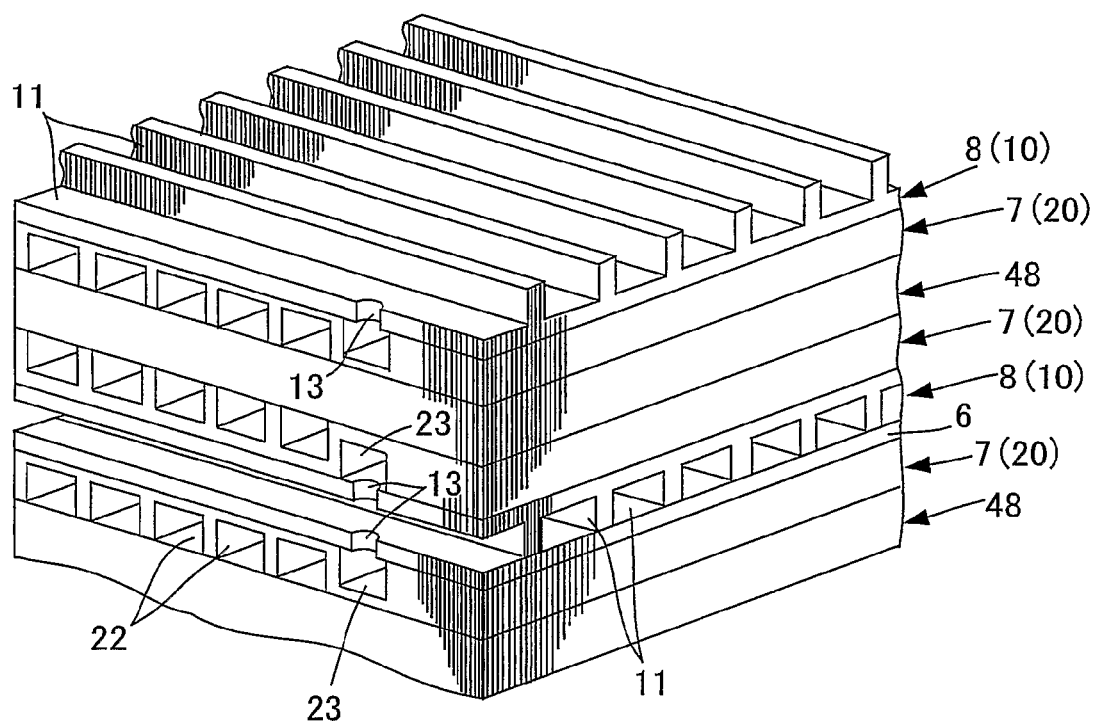
FIG. 20 is a perspective view showing another laminated construction.

FIG. 19 and FIG. 20 are perspective views in the state where the combustion elements 8, reforming elements 7 and hydrogen separation membrane elements 48 are laminated. Starting material vapor passing through the reforming catalyst passage 22 of the reforming element 7 is reformed to reformate gas by steam reforming due to the reforming catalyst. The reforming catalyst passage 22 of the reforming element 7 are set at relatively high pressure, and hydrogen gas in the reformate gas is selectively separated by the hydrogen permeable membrane 54. Hydrogen gas in the reformate gas penetrates the hydrogen permeable membrane 54 according to the pressure difference between the reforming catalyst passage 22 and the hydrogen-rich gas passage 55, and is introduced into the hydrogen-rich gas manifold 46 as hydrogen-rich gas via the hydrogen-rich gas passage 55. On the other hand, gases (remaining hydrogen, or methane and CO generated by the reforming reaction) which could not penetrate the hydrogen separation membrane 54, reach the reformate discharge gas manifold 16A as shown by the arrows in FIG. 19. The gas in the reformate discharged gas manifold 16A is mixed with additional fuel injected by the fuel injectors 31 if required, and is supplied to the supply passages 23 and the combustion gas passages 11 of the combustion elements 8 via the supply holes 13. In the combustion gas passages 11, as in the first and second embodiments, combustible gas burns, and the reforming catalyst passages 22 and starting material vaporization passages 21 of the reforming elements 7 are heated as a result.

The hydrogen separation membrane element 48 is provided with the hydrogen separation membrane 54 on both sides, so it is normally used in the laminated state shown in FIG. 20. Specifically, the reforming elements 7 are symmetrically disposed on both sides of the hydrogen separation membrane 48, and the combustion elements 8 are symmetrically disposed with respect to the hydrogen separation membrane element 48 outside the symmetrical reforming elements 7. The combustion elements 8 which are symmetrically arranged, are sealed by the partition plate 6. The reforming elements 7 and hydrogen separation membrane element 48 are laminated in that order above or below the partition plate 6. In the partition plate 6, manifolds are formed with the same arrangement as that of the reforming elements 7, combustion elements 8 and hydrogen separation membrane elements 48. The supply holes 13 are formed in parts where the supply passages 23 of the reforming elements 7 lie over or under the oxidation catalyst passages 11 of the combustion elements 8.

Figure 21:
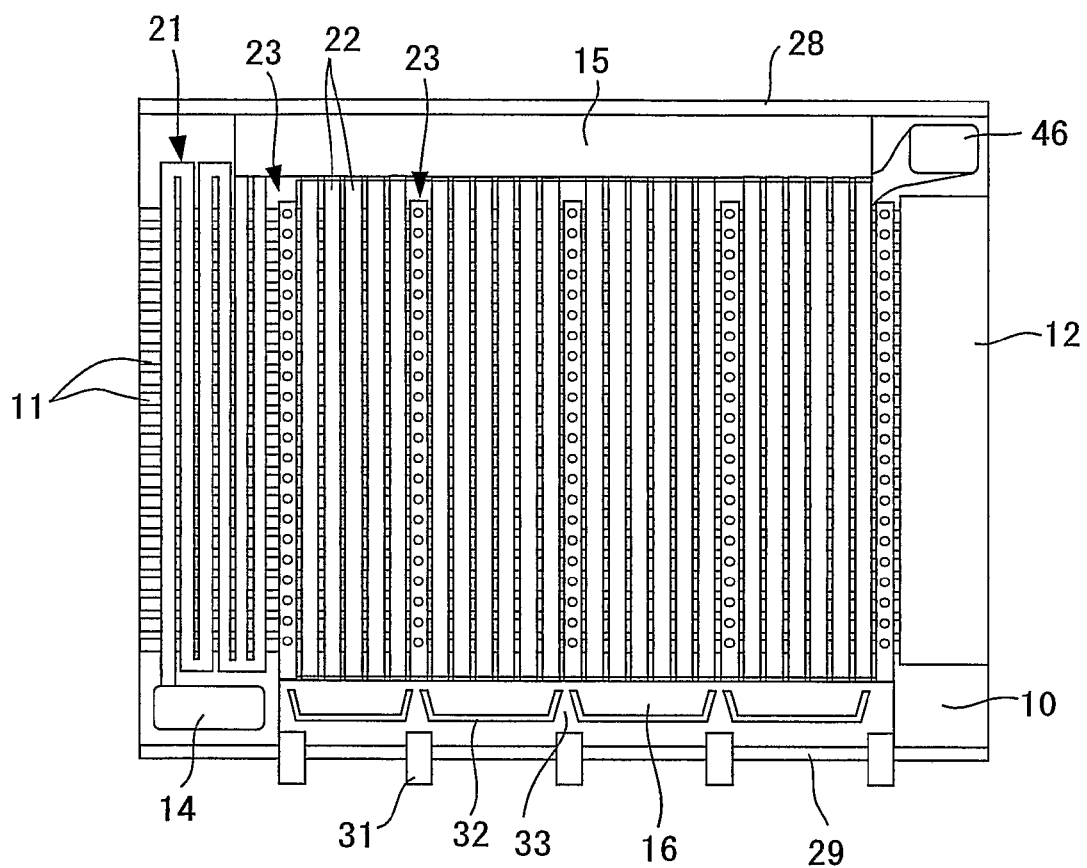
FIG. 21 is a plan transparent diagram of a reforming element.
Figure 22:
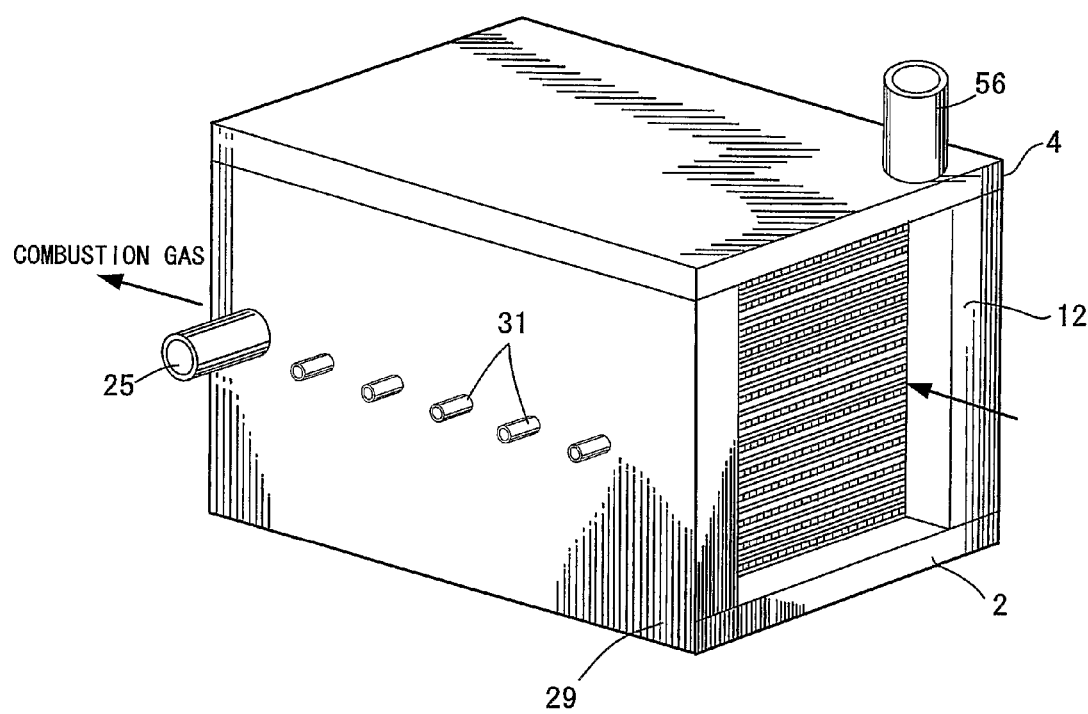
FIG. 22 is a full perspective view of the fuel reformer in an assembled state.

The laminate formed by laminating the partition plate 6, reforming elements 7, combustion elements 8 and hydrogen separation membrane elements 48 is gripped by the lower end plate 2 and upper end plate 4, and tightened in the lamination direction by stud bolts, not shown. Referring to FIG. 21, the open starting material vapor manifold 15 and reformate discharge gas manifold 16A are sealed by the covers 28, 29 to manufacture the fuel reformer 1 shown in FIG. 22.

In FIG. 21, the fuel injectors 31 are installed in the cover 29 facing the supply passages 23 which open towards the reformate discharge gas manifold 16A, in an identical way to that of the second embodiment. A fuel guide 32 is formed in the reformate discharge gas manifold 16A.

In the upper end plate 4, a hydrogen-rich gas outlet 56 is disposed in communication with the hydrogen-rich gas manifold 46, and in the cover 29 for the reformate discharge gas manifold 16A, the starting material inlet 25 in communication with the starting material manifold 14, is formed. The cover 29 is provided with fuel injectors 31 which inject additional fuel, but the fuel injectors 31 may be provided if required.

In addition to the advantages of the first embodiment and the second embodiment, this embodiment has the following advantages.

The fuel reformer 1 comprises the hydrogen separation membrane 54 adjacent to the reforming element 7, and the hydrogen-rich gas passage element 55 connected to the hydrogen-rich gas outlet 56. Hydrogen generated in the reforming elements 7 penetrates the hydrogen separation membrane element 48, and is introduced into the hydrogen-rich gas passage element 55. The hydrogen generated in the reforming elements 7 is purified by the hydrogen separation membrane 54 to give hydrogen-rich gas. The hydrogen-rich gas is supplied to the fuel cell from the hydrogen-rich gas outlet 56. On the other hand, the remaining hydrogen which did not pass through the hydrogen separation membrane 54 and methane or CO generated by the reforming reaction can be mixed with additional fuel if required, and burnt as reformate discharge gas by the combustion elements 8 so that it is not wasted.

In the fuel reformer 1, the hydrogen separation membrane element 54 is laminated in contact with both sides of the hydrogen-rich gas passage 55, and the reforming elements 7 and combustion elements 8 are laminated in this order on both sides of the hydrogen separation membrane element 54. In the case of an endothermal reaction where the reforming in the reforming elements 7 is steam reforming, reformate gas which has fallen to a lower temperature reaches the hydrogen separation membrane 54. The heat durability of the hydrogen separation membrane 54 can therefore be improved.

FIG. 23-FIG. 29 show a fifth embodiment of the fuel reformer. In this embodiment, in the construction of the third embodiment, hydrogen-rich gas from the reformate gas is separated by the hydrogen separation membrane element. Identical devices to those of the third embodiment are assigned identical symbols, and their description is omitted for simplicity.

Figure 23:
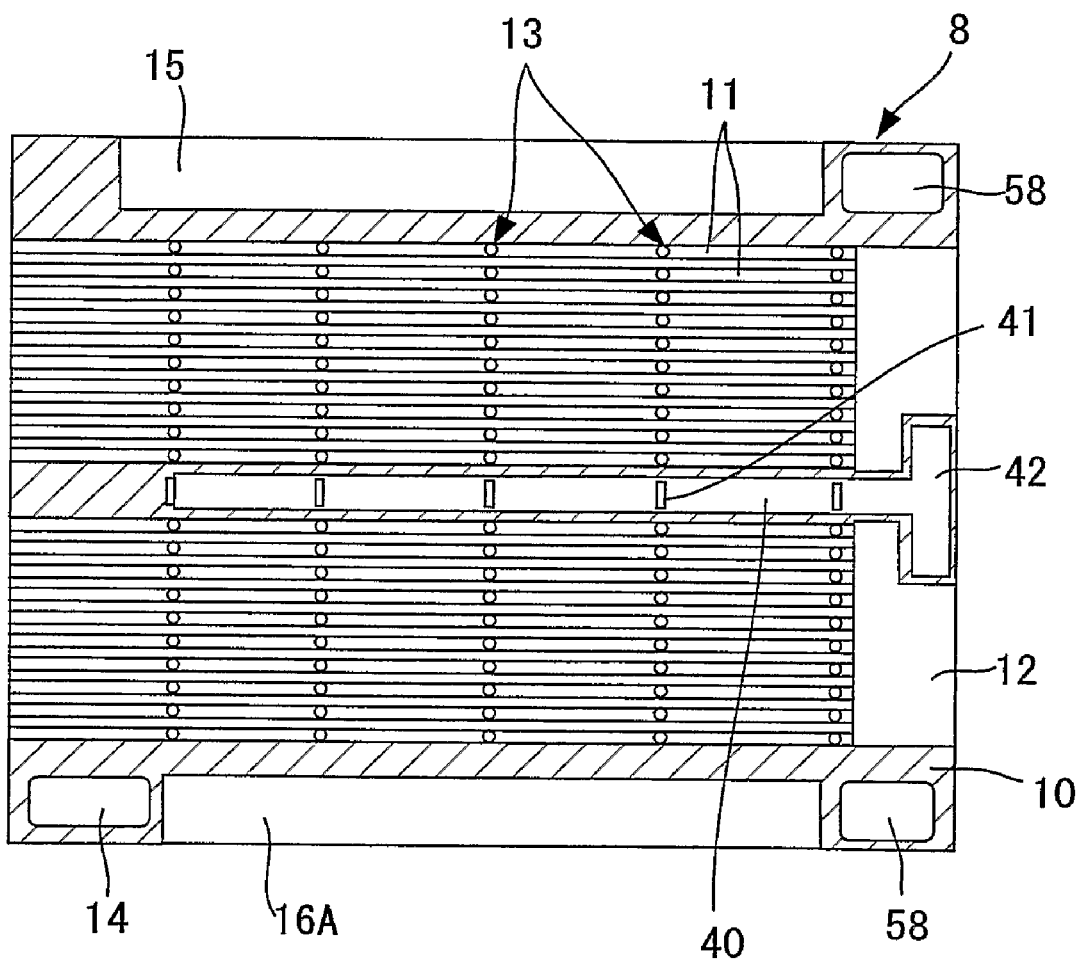
FIG. 23 is a cross-sectional plan view of a combustion element of a fuel reformer according to a fifth embodiment.

In FIG. 23, the combustion element 8 of this embodiment basically has an identical construction to that of the third embodiment, but the reformate gas manifold is omitted. A hydrogen-rich gas manifold 58 formed of a hole which does not communicate with other manifolds is newly installed on the side of the air manifold 12.

Figure 24:
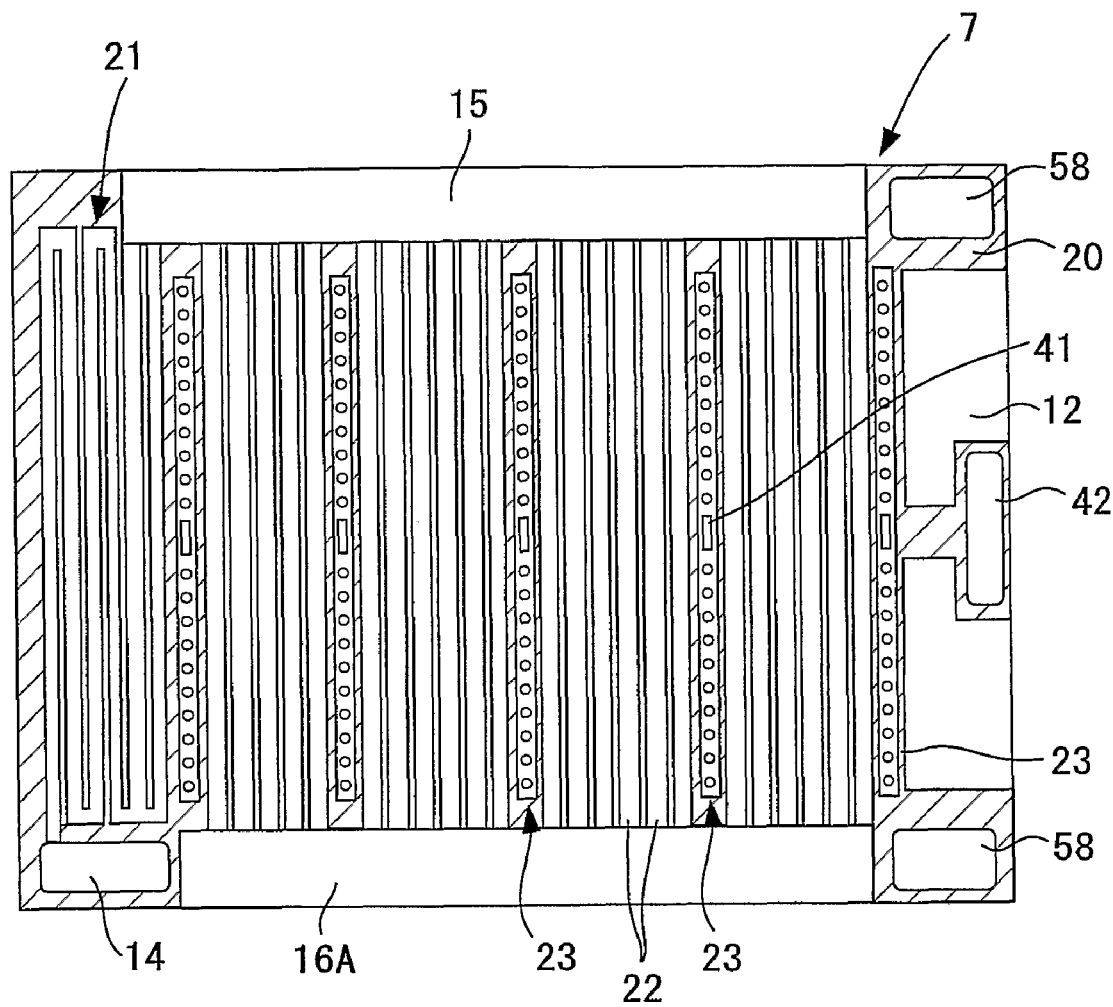
FIG. 24 is a cross-sectional plan view of a reforming element.

Referring to FIG. 24, the reforming elements 7 basically have an identical construction to that of the third embodiment. However, the reformate gas manifold is omitted, and the hydrogen-rich gas manifold 58 formed of a hole which does not communicate with other manifolds is newly installed on the side of the air manifold 12.

Figure 25:
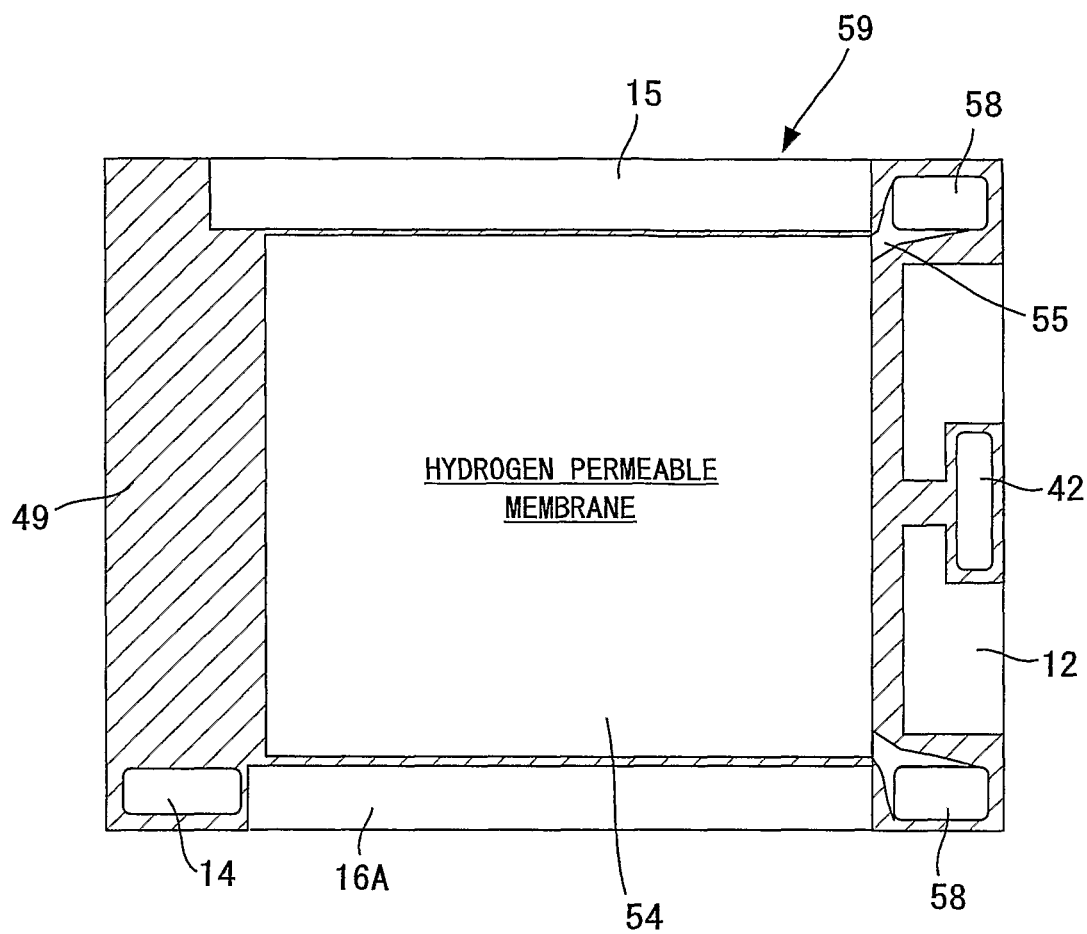
FIG. 25 is a cross-sectional plan view of a hydrogen separation membrane element.

Referring to FIG. 25, the frame 49 of a hydrogen separation membrane element 59 comprises the starting material manifold 14, starting material vapor manifold 15, reforming discharge gas manifold 16A, air manifold 12, distribution manifold 42 and hydrogen-rich gas manifold 58 in an identical arrangement to that of the combustion elements 8 and reforming elements 7.

The hydrogen separation membrane element 59 has an identical construction to that of the fourth embodiment. Although not shown, the hydrogen separation membrane element 59 comprises two plates having plural small holes arranged with an interval. The plates are surrounded by the frame 49, the hydrogen separation membrane 54 is formed on the plate surface, and the spaces between the plates is used as a hydrogen-rich gas passage.

Figure 26:
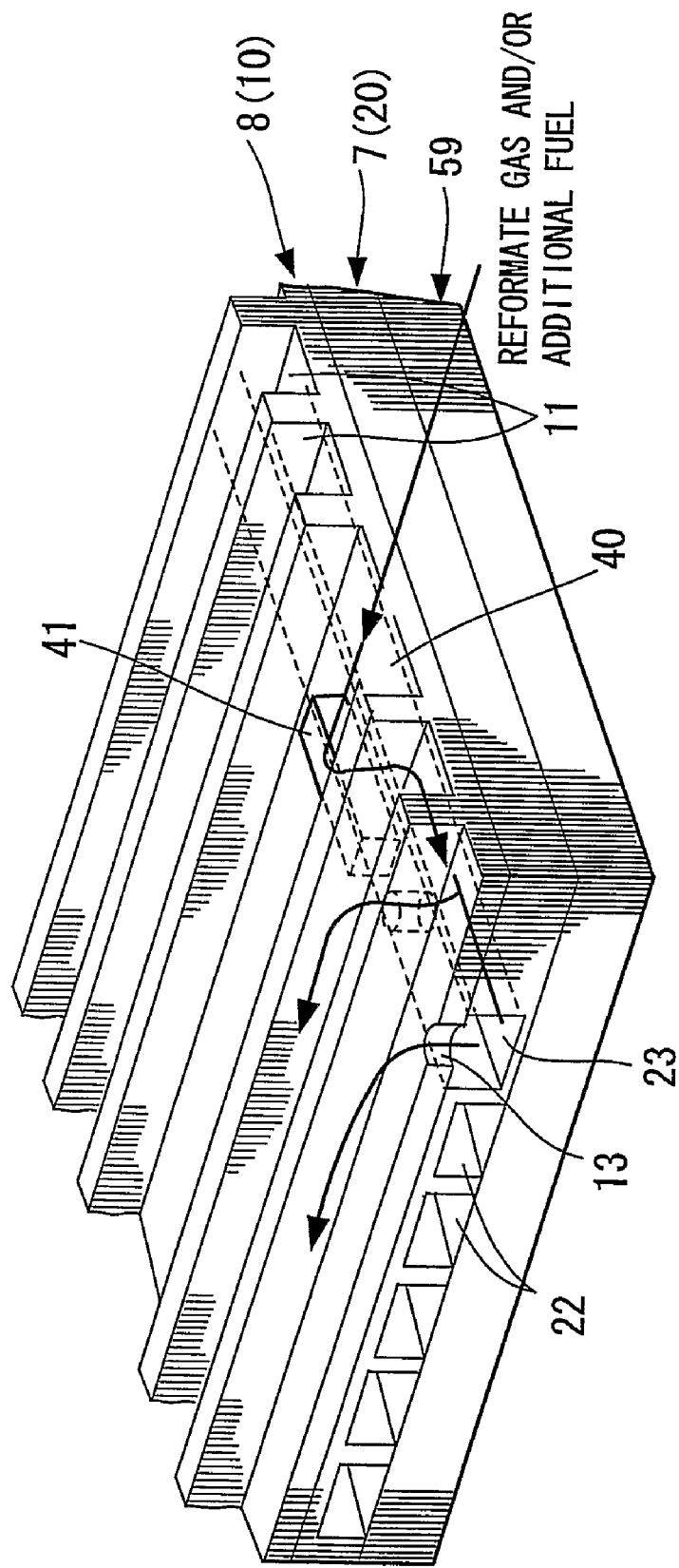
FIG. 26 is a perspective view showing the laminated construction of the fuel reformer.
Figure 27:
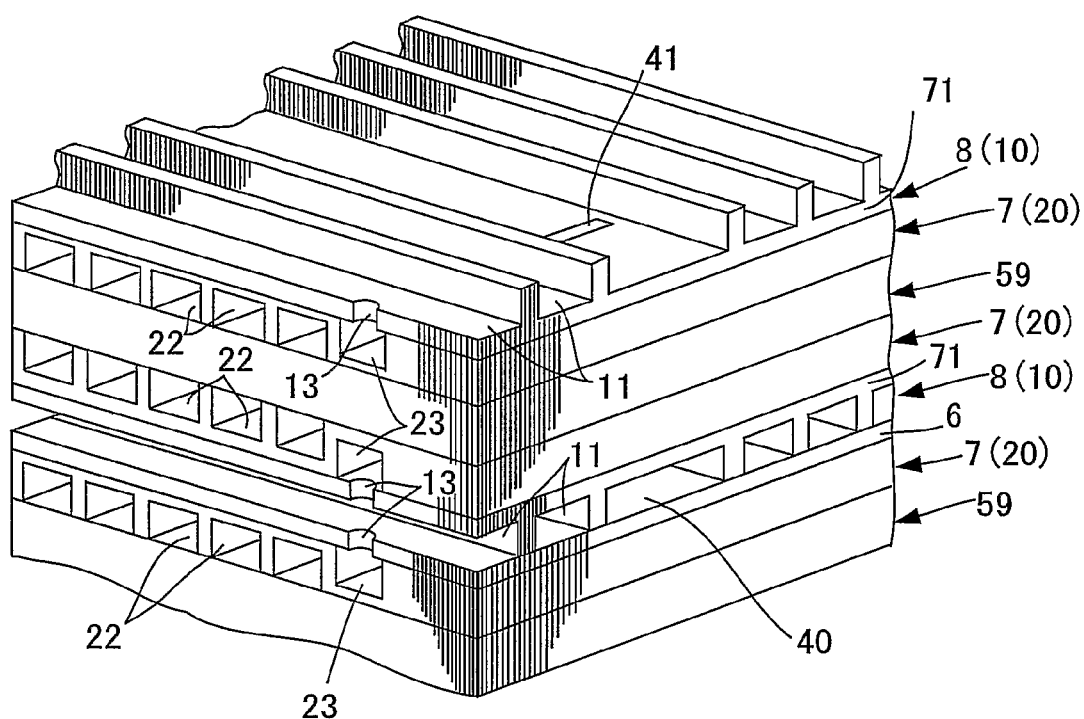
FIG. 27 is a perspective view showing another laminated construction.

Referring to FIG. 26 and FIG. 27, starting material vapor which passes through the reforming catalyst passage 22 of the reforming elements 7 is reformed to reformate gas by steam reforming due to the reforming catalyst. Since the reforming catalyst passages 22 of the reforming elements 7 are set at a relatively high pressure, the hydrogen component in the reformate gas is selectively separated by the hydrogen penetration membrane 54, and is introduced as hydrogen-rich gas to the hydrogen-rich gas manifold 58 via the hydrogen-rich gas passage 55. On the other hand, as shown by the arrows in FIG. 26, gas which did not penetrate the hydrogen separation membrane 54 (remaining hydrogen, and methane or CO generated by the reforming reaction) reaches the reformate discharge gas manifold 16A. The gas from the reformate discharge gas manifold 16A is mixed with additional fuel injected from the fuel injector 44 if required, and is supplied to the distribution manifold 42 via the connecting passage 43 provided above the upper end plate 4. Liquid fuel is gasified in the main passages 40. The mixed gas in the main passages 40 reaches the supply passages 23 via the distribution grooves 41, and is supplied to the respective combustion gas passages 11 of the combustion elements 8 via the supply holes 13. In the combustion gas passages 11, as in the third embodiment, the mixed gas undergoes a combustion reaction, and the reforming catalyst passages 22 and starting material vaporization passages 21 of the reforming elements 7 are heated.

As the hydrogen separation membrane element 59 comprises the hydrogen separation membrane 54 on both sides, it is normally used in the laminated state shown in FIG. 27. Specifically, the reforming elements 7 are symmetrically disposed on both sides of the hydrogen separation membrane element 59, and the combustion elements 8 are symmetrically disposed outside the symmetrical reforming elements 7. The combustion elements 8 in a symmetrical arrangement are covered by the partition plate 6, and further the reforming elements 7 and hydrogen separation membrane element 59 are laminated in this order. In the partition plate 6, manifolds are formed in an identical arrangement to that of the laminated reforming elements 7, combustion elements 8 and hydrogen separation membrane element 59. In the partition plate 6, the distribution grooves 41 are formed in parts where the main passages 40 of the combustion elements 8 lie over or under the supply passages 23 of the reforming elements 7, and the supply holes 13 are respectively formed in parts where the supply passages 23 of the reforming elements 7 lie over or under the combustion gas passages 11 of the combustion elements 8.

Figure 28:
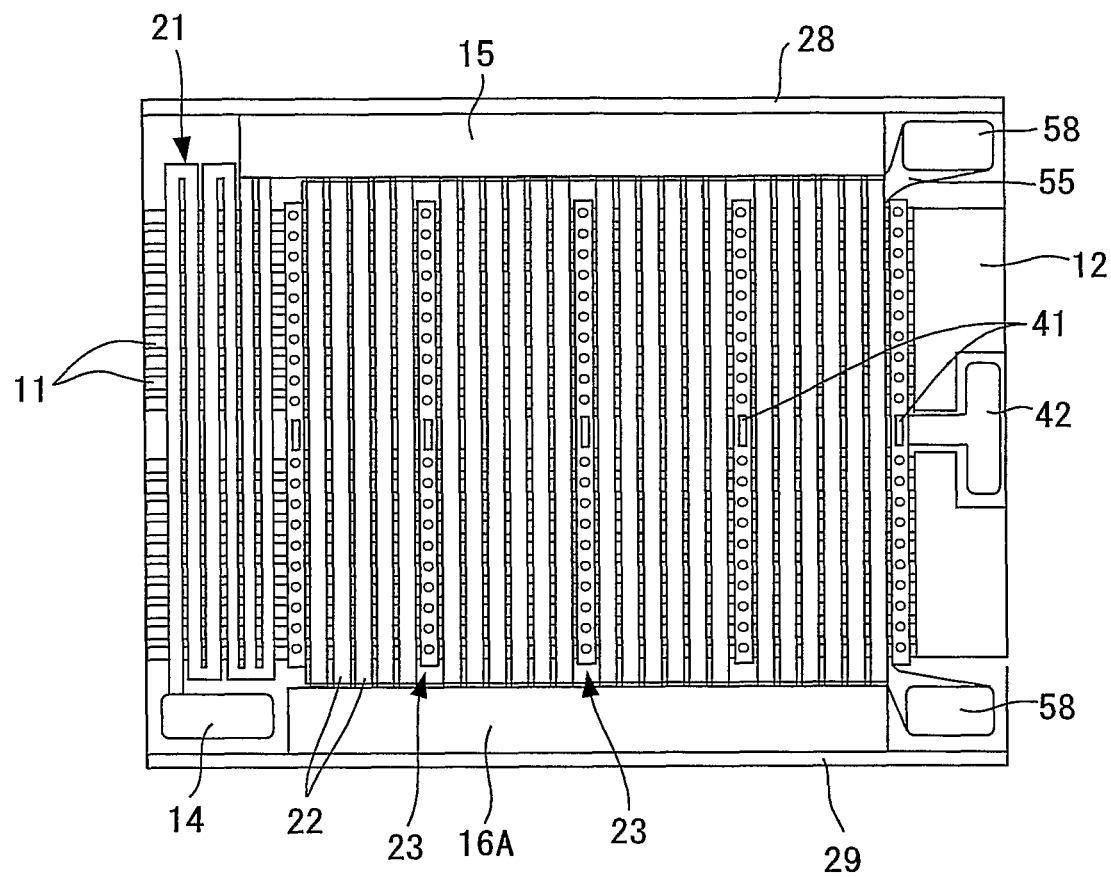
FIG. 28 is a plan transparent diagram of a reforming element.
Figure 29:
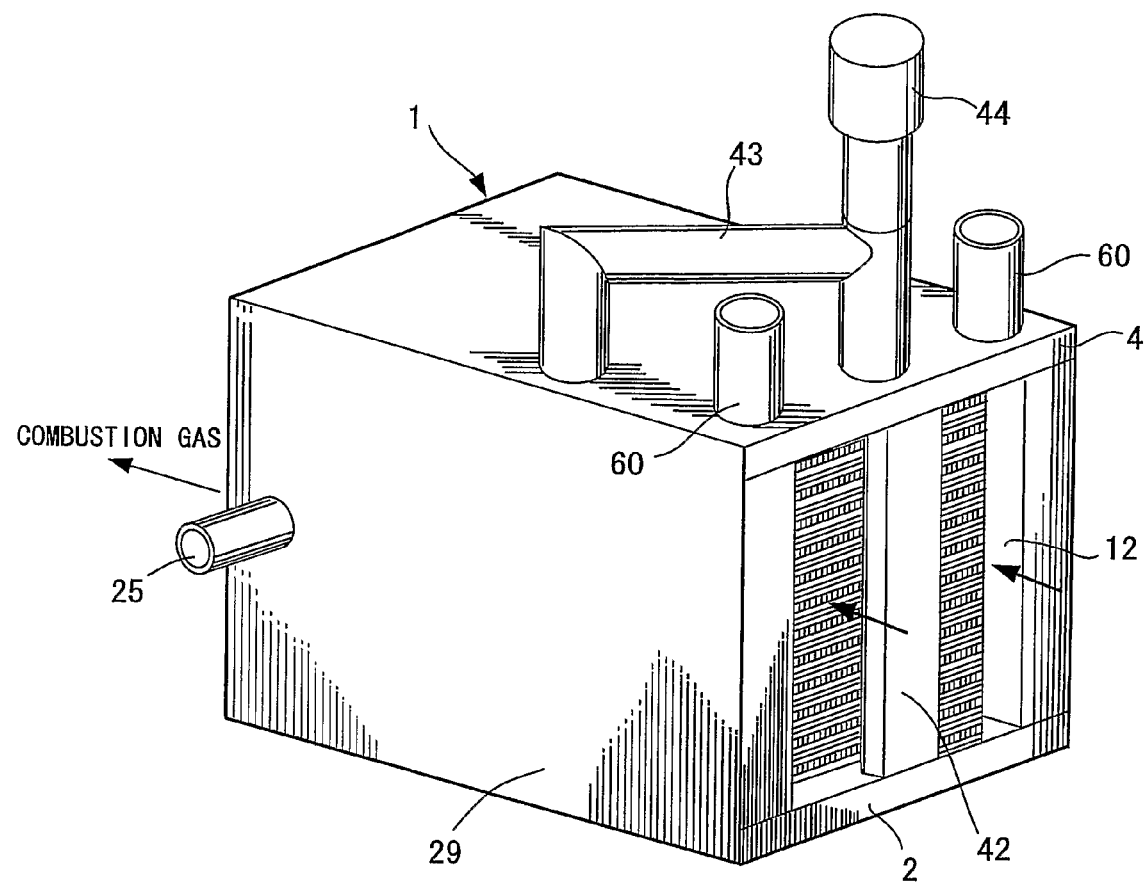
FIG. 29 is a full perspective view of the fuel reformer in an assembled state.

The laminate formed by the partition plate 6, reforming elements 7, combustion elements 8 and hydrogen separation membrane element 48 is gripped by the lower end plate 2 and upper end plate 4, and is tightened in the lamination direction by stud bolts, not shown. Referring to FIG. 28, the open starting material vapor manifold 15 and reformate discharge gas manifold 16A are sealed by the covers 28, 29 to form the fuel reformer 1 shown in FIG. 29. In the upper end plate 4, hydrogen-rich gas outlets 60 are respectively disposed in communication with a corresponding hydrogen-rich gas manifold 58. The fuel injector 44 is disposed in the communicating passage 43, and the starting material inlet 25 which communicates with the starting material manifold 14 is formed in the cover of the reformate discharge gas manifold 29.

This embodiment has an identical advantage to that of the fourth embodiment, in addition to the advantage of the first embodiment and the advantage of the third embodiment.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

The entire contents of Japanese Patent Application P2004-110166 (filed Apr. 2, 2004) are incorporated herein by reference.

The invention claimed is:

1. A fuel reformer, comprising:

a reforming element comprising at least one reforming catalyst passage supporting a reforming catalyst which generates reformate gas from fuel;

a reformate gas manifold communicating with said at least one reforming catalyst passage and collecting the generated reformate gas; and plural supply passages communicating with said at least one reforming catalyst passage and collecting the generated reformate gas; and plural supply passages communicating with the reformate gas manifold, said at least one reforming catalyst passage being disposed parallel to the supply passages; wherein said at least one reforming catalyst passage and the supply passages are installed substantially in the same plane in the reforming element;

a combustion element having at least one combustion gas passage, which heats the reforming element by the heat of combustion gas generated by burning the generated reformate gas with air in said at least one combustion gas passage, the reforming element and combustion element being laminated in the fuel reformer; and plural supply holes arranged in a line in the direction of combustion gas flow along said at least one combustion gas passage and provided between the reforming element and the combustion element, each supply hole communicating with said at least one combustion gas passage and one of the plural supply passages, wherein at least part of the generated reformate gas is supplied to said at least one combustion gas passage via each supply hole from said one of the plural supply passages of the reforming element, and is burnt downstream of each supply hole.

2. The fuel reformer as defined in claim 1, wherein the plural supply holes are disposed at a substantially predetermined interval along said at least one combustion gas passage.

3. The fuel reformer as defined in claim 1, wherein the reforming element comprises a reformate gas manifold communicating with said at least one reforming catalyst passage and collecting the generated reformate gas; and plural supply passages communicating with the reformate gas manifold, said at least one reforming catalyst passage being disposed between the supply passages, the fuel reformer comprising:
a partition disposed between the plural supply passages and said at least one combustion gas passage, the partition having the plural supply holes in parts where the plural supply passages overlie or underlie said at least one combustion gas passage,
wherein each supply passage communicates with a corresponding one of the plural supply holes, so that the reformate gas of the reformate gas manifold is supplied to said at least one combustion gas passage via the supply passages and supply holes.

4. The fuel reformer as defined in claim 3, comprising a starting material vapor manifold to which vapor of the fuel is supplied and which communicates with said at least one reforming catalyst passage.

5. The fuel reformer as defined in claim 3, wherein the partition is a horizontal part provided in the combustion element or a partition plate interposed between the reforming element and combustion element, and the horizontal part and partition plate are substantially perpendicular to the lamination direction of the reforming element and combustion element.

6. The fuel reformer as defined in claim 3, wherein the supply passages open into the reformate gas manifold, and
the reformate gas of the reformate gas manifold is supplied to said at least one combustion gas passage via the supply passages and supply holes.

7. The fuel reformer as defined in claim 3, wherein the combustion element further comprises a main passage which supplies the reformate gas to the supply passages of the reforming element, the main passage communicating with the reformate gas manifold via a distribution manifold, and
the partition is disposed between the main passage and supply passages and further comprises plural distribution holes which connect the main passage and supply passages.

8. The fuel reformer as defined in claim 7, wherein the distribution manifold and reformate gas manifold are configured to communicate by an external pipe of the fuel reformer.

9. The fuel reformer as defined in claim 3, wherein the supply passages of the reforming elements overlie or underlie said at least one combustion gas passage of the combustion elements.

10. The fuel reformer as defined in claim 4, wherein the reforming element comprises a starting material manifold to which liquid fuel is supplied, and a starting material vaporization passage connecting the starting material vapor manifold and the starting material manifold,
the liquid fuel from the starting material manifold vaporizes in the starting material vaporization passage, and the vaporized fuel is introduced into the starting material vapor manifold.

11. The fuel reformer as defined in claim 10, wherein at least one of the supply passages and at least one of the supply holes are disposed between the starting material vaporization passage and one of said at least one reforming catalyst passage closest to the starting material vaporization passage.

12. The fuel reformer as defined in claim 4, wherein the starting material vapor manifold and reformate gas manifold are formed so that they are open to the outer circumferential surface of the fuel reformer when the combustion element, reforming element, partition and/or hydrogen penetration membrane element are laminated, and wherein the starting material vapor manifold and reformate gas manifold are sealed by their respective cover member.

13. The fuel reformer as defined in claim 6, comprising additional fuel supply means which supplies additional fuel to at least one of the openings of the supply passages in the reformate gas manifold.

14. The fuel reformer as defined in claim 7, comprising additional fuel supply means which supplies additional fuel to the distribution manifold or an external pipe, the external pipe communicating the distribution manifold and reformate gas manifold.

15. The fuel reformer as defined in claim 1, wherein said at least one reforming catalyst passage of the reforming elements is formed by a groove, and a partition member which seals the groove.

16. The fuel reformer as defined in claim 1, wherein said at least one combustion gas passage of the combustion element is formed by a groove, and a partition member which seals the groove or a horizontal part of the reforming element, the horizontal part is substantially perpendicular to the lamination direction of the reforming element and combustion element.

17. The fuel reformer as defined in claim 16, wherein a wall surface of said at least one combustion gas passage of the combustion element supports an oxidation catalyst.

18. The fuel reformer as defined in claim 1, wherein the pressure in the combustion element is set lower than the pressure in the reforming element.

19. The fuel reformer as defined in claim 1, comprising a hydrogen separation membrane element in contact with the reforming element, the hydrogen separation membrane element comprising at least one hydrogen penetration membrane and a hydrogen-rich gas passage connected to a hydrogen-rich gas outlet,
wherein hydrogen generated in the reforming element penetrates the hydrogen penetration membrane and flows through the hydrogen-rich gas passage.

20. The fuel reformer as defined in claim 19, wherein the hydrogen membrane element comprises said at least one hydrogen penetration membrane alongside the hydrogen-rich gas passage, and
the reforming element and combustion element are laminated in this order on said at least one hydrogen penetration membrane on the opposite side to the hydrogen-rich gas passage.

* * * * *